(12) United States Patent
Yamano

(10) Patent No.: US 8,411,370 B2
(45) Date of Patent: Apr. 2, 2013

(54) ZOOM LENS AND IMAGING APPARATUS

(75) Inventor: Hiroki Yamano, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/362,704

(22) Filed: Jan. 31, 2012

(65) Prior Publication Data
US 2012/0236420 A1 Sep. 20, 2012

(30) Foreign Application Priority Data

Mar. 15, 2011 (JP) .................. 2011-057060

(51) Int. Cl.
G02B 15/14 (2006.01)
G02B 3/02 (2006.01)
G02B 9/14 (2006.01)
(52) U.S. Cl. .................. 359/690; 359/716; 359/787
(58) Field of Classification Search .................. 359/716, 359/689, 690, 784, 785, 787
See application file for complete search history.

(56) References Cited

FOREIGN PATENT DOCUMENTS

| JP | 2005-338740 | 12/2005 |
|---|---|---|
| JP | 2006-023529 | 1/2006 |
| JP | 2007-010695 | 1/2007 |
| JP | 3977150 | 6/2007 |
| JP | 2010-048855 | 3/2010 |

*Primary Examiner* — Jack Dinh
(74) *Attorney, Agent, or Firm* — Rader, Fishman & Grauer PLLC

(57) ABSTRACT

A zoom lens includes, in order from an object side to an image side: a first lens group that has a positive refractive power; a second lens group that has a negative refractive power; and a third lens group that has a positive refractive power, wherein the second lens group is constituted by three lenses of a first negative lens, a second negative lens, and a positive lens which are arranged in order from the object side to the image side, wherein an aspheric surface is formed on at least an object side of the positive lens in a shape of which a curvature gradually decreases as an outer periphery of the lens gets closer from an optical axis, and wherein the following Conditional Expressions (1) and (2) are satisfied:

$$0.8 < 10 \times (R22r - R23f)/(R22r + R23f) < 1.8 \quad (1)$$

$$3.0 < 100 \times \{D(2,23)/TH2\} < 7.0 \quad (2).$$

9 Claims, 28 Drawing Sheets

ZOOM LENS AND IMAGING APPARATUS

FIELD

The present technology relates to a zoom lens and an imaging apparatus. Specifically, the present technology relates to a zoom lens, which is suitable for a digital still camera, a video camera, a surveillance camera, or the like while having a high zoom ratio and a sufficient fastness of the lens speed and being able to achieve an increase in viewing angle sufficiently, and an imaging apparatus having the zoom lens.

BACKGROUND

Recently, as a market of imaging apparatuses such as the digital still camera has become very large, users have varied demands for digital still cameras. Needless to say, not only demands for an increase in image quality, a decrease in size, and a decrease in thickness, but also demands for an increase in magnification and the fastness of the photographic lens and an increase in viewing angle have become very strong.

Generally, among the zoom lenses which can be provided in the imaging apparatuses, a so-called positive lead type zoom lens, of which the lens group closest to the object side has a positive power, takes advantages that the zoom ratio can be set to be high and the optical system can be designed to be fast in the entire zoom range. Accordingly, the positive lead type zoom lenses, which are appropriate to achieve high magnification for example a zoom ratio of 10 or more magnifications, have been mostly used.

As the positive lead type zoom lens, there is a zoom lens constituted of four or more groups which include three lens groups respectively having positive, negative, and positive refractive powers in order from the object side to the image side (for example, refer to JP-A-2006-23529, 2005-338740, 2010-48855, 2007-10695 and Japanese Patent No. 3977150).

JP-A-2006-23529, 2005-338740, 2010-48855, and Japanese Patent No. 3977150 disclose zoom lenses each of which is constituted of four groups having positive, negative, positive, and positive refractive powers in order from the object side to the image side.

JP-A-2007-10695 discloses a zoom lens, which is constituted of four groups having positive, negative, positive, and positive refractive powers in order from the object side to the image side, and a zoom lens which is constituted of five groups having positive, negative, positive, positive, and positive refractive powers in order from the object side to the image side.

SUMMARY

However, as for each zoom lens disclosed in JP-A-2006-23529 and Japanese Patent No. 3977150, an increase in magnification was not sufficiently achieved. Further, each zoom lens disclosed in JP-A-2006-23529, 2005-338740, 2010-48855, and Japanese Patent No. 3977150 is characterized in that the outer diameter of the lens, which is disposed to be closest to the object side, tends to increase as a viewing angle increases. Hence, a decrease in size and an increase in imaging field angle were not sufficiently achieved.

Further, generally, in order to achieve an increase in viewing angle of the optical system or an increase in magnification thereof, the optical design for satisfactorily correcting aberrations and reducing error sensitivity at the time of manufacture is necessary. Hence, it is necessary to increase the number of lenses or increase the total length of the optical system.

In this point of view, likewise in the zoom lens disclosed in JP-A-2007-10695, as the number of lenses of the second lens group increases or the stroke during the zooming increases, the total optical length necessarily increases. Thus, a decrease in size was not sufficiently achieved.

In particular, in a so-called collapsible zoom lens which is satisfactorily housed by collapsing the lens in an unused state (while photography is not performed), it is extremely difficult to decrease the whole thickness by reducing the number and thicknesses of lenses and shortening the stroke during zooming. Accordingly, there is a high demand for a zoom lens capable of achieving an increase in magnification or an increase in viewing angle and simultaneously a decrease in size.

Further, the imaging apparatus using the solid-state imaging device is preferable since the zoom lens, which is nearly telecentric on the image side, is able to uniform the luminance on the image plane. As for such a zoom lens, it is preferable that the lens group closest to the image side has positive refractive power.

Accordingly, it is desirable to provide a zoom lens and an imaging apparatus capable of achieving an increase in viewing angle and an increase in magnification while having a small size, having a satisfactory optical performance, and being fast in the entire zoom range.

An embodiment of the present technology is directed to a zoom lens including, in order from an object side to an image side: a first lens group that has a positive refractive power; a second lens group that has a negative refractive power; and a third lens group that has a positive refractive power. The second lens group is constituted by three lenses of a first negative lens, a second negative lens, and a positive lens which are arranged in order from the object side to the image side. An aspheric surface is formed on at least an object side of the positive lens in a shape of which a curvature gradually decreases as an outer periphery of the lens gets closer from an optical axis. In addition, the lens satisfies the following Conditional Expressions (1) and (2).

$$0.8 < 10 \times (R22r - R23f)/(R22r + R23f) < 1.8 \quad (1)$$

$$3.0 < 100 \times \{D(2,23)/TH2\} < 7.0 \quad (2)$$

Here, R22r is a paraxial radius of curvature of an image side surface of the second negative lens in the second lens group, R23f is a paraxial radius of curvature of the object side surface of the positive lens in the second lens group, D(2, 23) is an air space, which is present between the second negative lens and the positive lens of the second lens group, on the optical axis, and TH2 is a thickness on the optical axis from a surface closest to the object side in the second lens group to a surface closest to the image side.

Accordingly, in the zoom lens, the paraxial radius of curvature of the object side surface of the positive lens, the refractive power of the air lens, and the space of the air lens are appropriately set.

It is preferable that the above-mentioned zoom lens satisfies the following Conditional Expression (3).

$$1.6 < f(2,3)/|f2| < 2.5 \quad (3)$$

Here, f(2, 3) is a focal length of the positive lens in the second lens group and f2 is a focal length of the second lens group.

By making the zoom lens satisfy Conditional Expression (3), the refractive power of the positive lens of the second lens group is appropriately set.

It is preferable that the above-mentioned zoom lens satisfies the following Conditional Expression (4).

$$1.1<\{R23f/(n23-1)\}/|f2|<1.65 \tag{4}$$

Here, n23 is a refractive index of the positive lens in the second lens group and f2 is the focal length of the second lens group.

By making the zoom lens satisfy Conditional Expression (4), the positive refractive power of the object side surface of the positive lens is appropriately set.

It is preferable that the above-mentioned zoom lens satisfies the following Conditional Expressions (5) and (6).

$$1.0<|f2|/fW<1.5 \tag{5}$$

$$0.05<|f2|/fT<0.15 \tag{6}$$

Here, f2 is the focal length of the second lens group, fW is a focal length of a whole optical system at a wide-angle end, and fT is a focal length of the whole optical system at a telephoto end.

By making the zoom lens satisfy Conditional Expressions (5) and (6), respective ratios of the focal length of the second lens group to the focal lengths of the whole optical system at the wide-angle end and the telephoto end are appropriately set.

In the above-mentioned zoom lens, it is preferable that an outer peripheral portion of the image side surface of the second negative lens is in contact with an outer peripheral portion of the object side surface of the positive lens. By making the outer peripheral portion of the image side surface of the second negative lens be in contact with the outer peripheral portion of the object side surface of the positive lens, it is possible to secure the tilt accuracy of the positive lens relative to the second negative lens due to the lens molding accuracy.

In the above-mentioned zoom lens, it is preferable that the outer peripheral portion of the object side surface of the positive lens is formed as a flat surface perpendicular to the optical axis. In addition, it is preferable that the flat surface of the positive lens is in contact with the outer peripheral portion of the image side surface of the second negative lens.

Since the outer peripheral portion of the object side surface of the positive lens is formed as a flat surface perpendicular to the optical axis and the flat surface of the positive lens is in contact with the outer peripheral portion of the image side surface of the second negative lens, the relative tilt accuracy between the second negative lens and the positive lens is improved by vibration occurring in use of the imaging apparatus.

In the above-mentioned zoom lens, it is preferable that the positive lens is formed of a glass material through molding.

Since the positive lens is formed of a glass material through molding, the satisfactory molding accuracy of the positive lens is secured through the molding accuracy.

In the above-mentioned zoom lens, it is preferable that during zooming from the wide-angle end to the telephoto end, the first lens group is shifted to the object side so as to be distanced from the second lens group, and the third lens group is shifted to the object side so as to come close to the second lens group.

Since the first lens group is shifted to the object side so as to be distanced from the second lens group and the third lens group is shifted to the object side so as to come close to the second lens group during zooming from the wide-angle end to the telephoto end, the effect of the power variation of the second lens group and the third lens group, which greatly contribute to the effect of the power variation during the zooming, is maximized.

Another embodiment of the present technology is directed to an imaging apparatus including: a zoom lens; and an imaging device converting an optical image formed by the zoom lens into an electric signal. The zoom lens includes, in order from an object side to an image side: a first lens group that has a positive refractive power; a second lens group that has a negative refractive power; and a third lens group that has a positive refractive power. The second lens group is constituted by three lenses of a first negative lens, a second negative lens, and a positive lens which are arranged in order from the object side to the image side. An aspheric surface is formed on at least an object side of the positive lens in a shape of which a curvature gradually decreases as an outer periphery of the lens gets closer from an optical axis. In addition, the lens satisfies the following Conditional Expressions (1) and (2).

$$0.8<10\times(R22r-R23f)/(R22r+R23f)<1.8 \tag{1}$$

$$3.0<100\times\{D(2,23)/TH2\}<7.0. \tag{2}$$

Here, R22r is a paraxial radius of curvature of an image side surface of the second negative lens in the second lens group, R23f is a paraxial radius of curvature of the object side surface of the positive lens in the second lens group, D(2, 23) is an air space, which is present between the second negative lens and the positive lens of the second lens group, on the optical axis, and TH2 is a thickness on the optical axis from a surface closest to the object side in the second lens group to a surface closest to the image side.

Accordingly, in the imaging apparatus, the paraxial radius of curvature of the object side surface of the positive lens, the refractive power of the air lens, and the space of the air lens are appropriately set.

The zoom lens and the imaging apparatus according to the embodiments of the present technology are able to achieve an increase in viewing angle and an increase in magnification while having a small size, having a satisfactory optical performance, and being fast in the entire zoom range.

DETAILED DESCRIPTION

Hereinafter, preferred embodiments of a zoom lens and an imaging apparatus according to an embodiment of the present technology will be described.

[Configuration of Zoom Lens]

The zoom lens according to the embodiment of the present technology includes, in order from the object side to the image side: a first lens group that has a positive refractive power; a second lens group that has a negative refractive power; and a third lens group that has a positive refractive power.

Further, in the zoom lens according to the embodiment of the present technology, the second lens group is constituted by three lenses of a first negative lens, a second negative lens, and a positive lens which are arranged in order from the object side to the image side. In addition, an aspheric surface is formed on at least an object side of the positive lens in a shape of which a curvature gradually decreases as the outer periphery of the lens gets closer from the optical axis (refer to FIG. 1).

Figure 1:
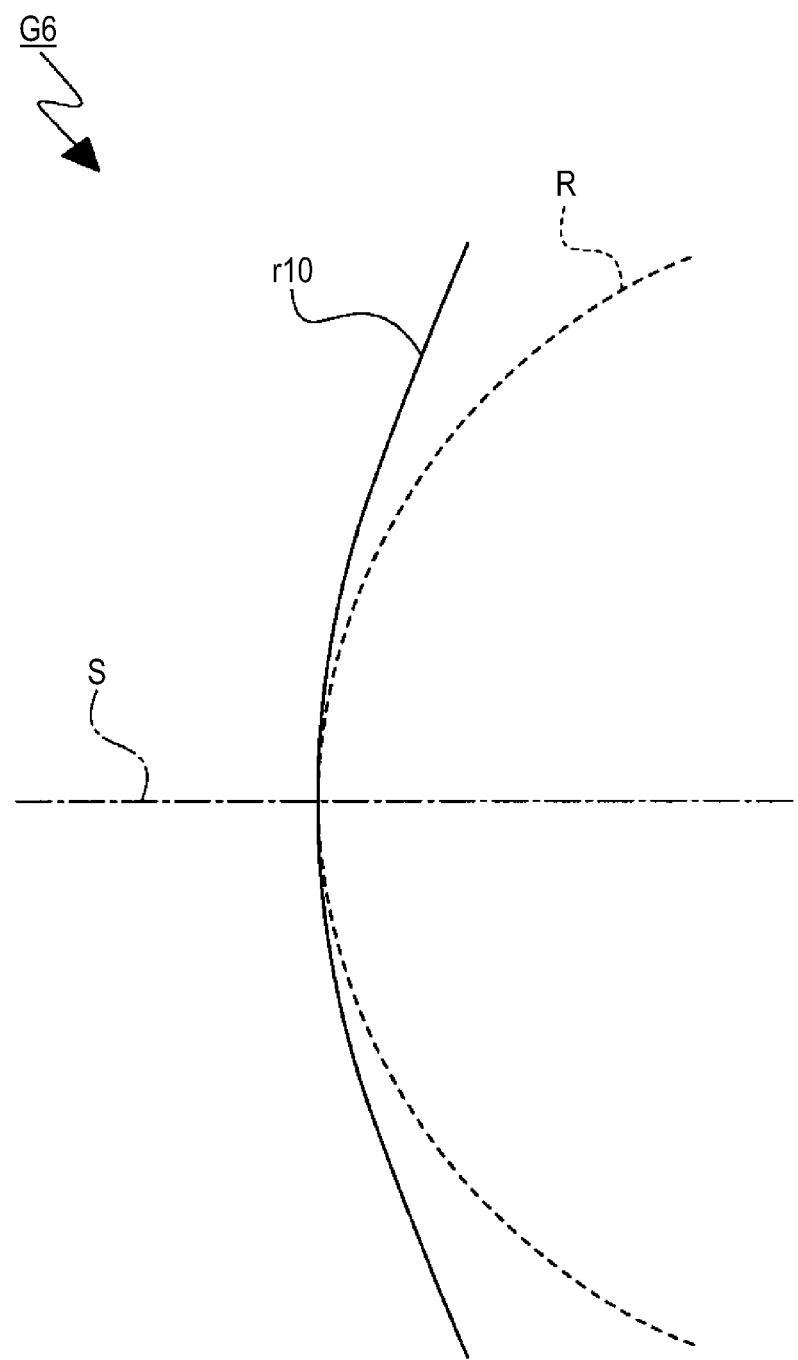
FIG. 1 is a schematic diagram illustrating comparison between a shape of the aspheric surface formed on the object side of the positive lens and the paraxial radius of curvature of the positive lens.

FIG. 1 is a schematic diagram illustrating comparison between a shape of the aspheric surface r10 formed on the object side of the positive lens G6 and the paraxial radius R of curvature of the positive lens G6. The aspheric surface r10 of the positive lens G6 is formed such that the space between the surface and the paraxial radius of curvature R is set to be larger at the position farther from the optical axis S and closer to the outer periphery, and thus the surface is formed such that the curvature gradually decreases as the outer periphery of the lens gets closer from the optical axis S.

By forming the aspheric surface with such a shape, even when the second lens group includes a small number of lenses for example three lenses, it is possible to efficiently correct coma aberration of a peripheral viewing angle in the range from the wide-angle end to the telephoto end and spherical aberration of an on-axis viewing angle at the telephoto end. Hence, it is possible to improve image quality.

Furthermore, the zoom lens according to the embodiment of the present technology satisfies the following Conditional Expressions (1) and (2).

$$0.8 < 10 \times (R22r - R23f)/(R22r + R23f) < 1.8 \quad (1)$$

$$3.0 < 100 \times \{D(2,23)/TH2\} < 7.0 \quad (2)$$

Here, R22r is a paraxial radius of curvature of an image side surface of the second negative lens in the second lens group, R23f is a paraxial radius of curvature of the object side surface of the positive lens in the second lens group, D(2, 23) is an air space, which is present between the second negative lens and the positive lens of the second lens group, on the optical axis, and TH2 is a thickness on the optical axis from a surface closest to the object side in the second lens group to a surface closest to the image side.

Conditional Expression (1) defines a shape factor of the air lens (air gap) which is present between the second negative lens and the positive lens of the second lens group.

When the upper limit of Conditional Expression (1) is exceeded, the paraxial radius of curvature of the object side surface of the positive lens excessively decreases. Hence, it is difficult to achieve an increase in viewing angle and an increase in magnification by satisfactorily correcting aberrations in the entire zoom range, thereby causing deterioration in image quality.

In contrast, when the lower limit of Conditional Expression (1) is exceeded, the refractive power of the air lens excessively decreases. Hence, it is difficult to achieve a sufficient decrease in size of the second lens group, thereby causing an increase in size of the whole optical system.

Accordingly, by making the zoom lens satisfy Conditional Expression (1), the paraxial radius of curvature of the object side surface of the positive lens is appropriately set, and thus it is possible to achieve an increase in viewing angle and an increase in magnification by satisfactorily correcting aberrations in the entire zoom range. In addition, the refractive power of the air lens is appropriately set, and it is possible to achieve a decrease in size of the whole optical system.

Conditional Expression (2) defines the air gap of the air lens which is present between the second negative lens and the positive lens of the second lens group.

When the upper limit of Conditional Expression (2) is exceeded, the space of the air lens (the size thereof in the optical axis direction) excessively increases. Hence, the size of the second lens group increases, thereby causing an increase in size of the whole optical system.

In contrast, when the lower limit of Conditional Expression (2) is exceeded, the space of the air lens excessively decreases. Hence, during assembly of the second lens group, the second negative lens may come into contact with the positive lens. Thus, there is a concern about damage of the optical surfaces thereof. Further, there is a concern that the moisture, which is condensed in the imaging apparatus, permeates into the interspace between the lenses because of the surface tension.

Accordingly, by making the zoom lens satisfy Conditional Expression (2), the space of the air lens is appropriately set, and thus it is possible to achieve a decrease in size of the optical system, prevention against contact between lenses, and the like.

It is preferable that the zoom lens according to the embodiment of the present technology satisfies the following Conditional Expression (3).

$$1.6 < f(2,3)/|f2| < 2.5 \quad (3)$$

Here, $f(2, 3)$ is a focal length of the positive lens in the second lens group and $f2$ is a focal length of the second lens group.

Conditional Expression (3) defines the refractive power of the positive lens of the second lens group.

When the upper limit of Conditional Expression (3) is exceeded, the refractive power of the positive lens excessively decreases. Hence, in particular, it is difficult that the position of the entrance pupil of the optical system at the wide-angle end is disposed to be sufficiently close to the object side, thereby causing an increase in size of the first lens group and the second lens group.

In contrast, when the lower limit of Conditional Expression (3) is exceeded, the refractive power of the positive lens excessively increases. Hence, it is difficult to satisfactorily correct aberrations of the second lens group in the entire zoom range, thereby causing deterioration in image quality.

Accordingly, by making the zoom lens satisfy Conditional Expression (3), the refractive power of the positive lens of the second lens group is appropriately set. Thus, it is possible to achieve a decrease in size of the first lens group and the second lens group, and it is possible to satisfactorily correct aberrations of the second lens group in the entire zoom range. As a result, it is possible to improve image quality.

It is preferable that the zoom lens according to the embodiment of the present technology satisfies the following Conditional Expression (4).

$$1.1 < \{R23f/(n23-1)\}/|f2| < 1.65 \quad (4)$$

Here, $n23$ is a refractive index of the positive lens in the second lens group and $f2$ is the focal length of the second lens group.

Conditional Expression (4) defines the refractive power of the object side surface of the positive lens.

When the lower limit of Conditional Expression (4) is exceeded, the positive refractive power of the object side surface of the positive lens excessively increases. Hence, in particular, it is difficult to correct coma aberrations at the wide-angle end and the telephoto end and spherical aberration at the telephoto end. In addition, since the sensitivity of eccentricity excessively increases, the difficulty level of manufacture increases.

In contrast, when the upper limit of Conditional Expression (4) is exceeded, the positive refractive power of the object side surface of the positive lens excessively decreases. Hence, it is difficult that the position of the image-side principal point of the second lens group is disposed to be sufficiently close to the object side, and it is difficult that the position of the entrance pupil at the wide-angle end is disposed to be sufficiently close to the object side, thereby causing, in particular, an increase in size of the first lens group and the second lens group in the diameter direction.

Accordingly, by making the zoom lens satisfy Conditional Expression (4), the positive refractive power of the object side surface of the positive lens is appropriately set. Thus, it is possible to satisfactorily correct respective aberrations, and it is possible to reduce the sensitivity of eccentricity. Further, it is possible to decrease the sizes of the first lens group and the second lens group.

It is preferable that the zoom lens according to the embodiment of the present technology satisfies the following Conditional Expressions (5) and (6).

$$1.0 < |f2|/fW < 1.5 \quad (5)$$

$$0.05 < |f2|/fT < 0.15 \quad (6)$$

Here, $f2$ is the focal length of the second lens group, $fW$ is a focal length of a whole optical system at a wide-angle end, and $fT$ is a focal length of the whole optical system at a telephoto end.

Conditional Expression (5) defines a ratio of the focal length of the second lens group to the focal length of the whole optical system at the wide-angle end.

Conditional Expression (6) defines a ratio of the focal length of the second lens group to the focal length of the whole optical system at the telephoto end.

When the upper limits of Conditional Expressions (5) and (6) are exceeded, the refractive power of the second lens group excessively decreases. Hence, this causes an increase in size of the optical system.

In contrast, when the lower limits of Conditional Expressions (5) and (6) are exceeded, the refractive power of the second lens group excessively increases. Hence, it is difficult to correct aberrations, thereby causing deterioration in image quality.

Accordingly, by making the zoom lens satisfy Conditional Expressions (5) and (6), respective ratios of the focal length of the second lens group to the focal lengths of the whole optical system at the wide-angle end and the telephoto end are appropriately set. Thus, it is possible to achieve a decrease in size of the optical system, and it is possible to satisfactorily correct aberrations. As a result, it is possible to improve image quality.

Figure 2:
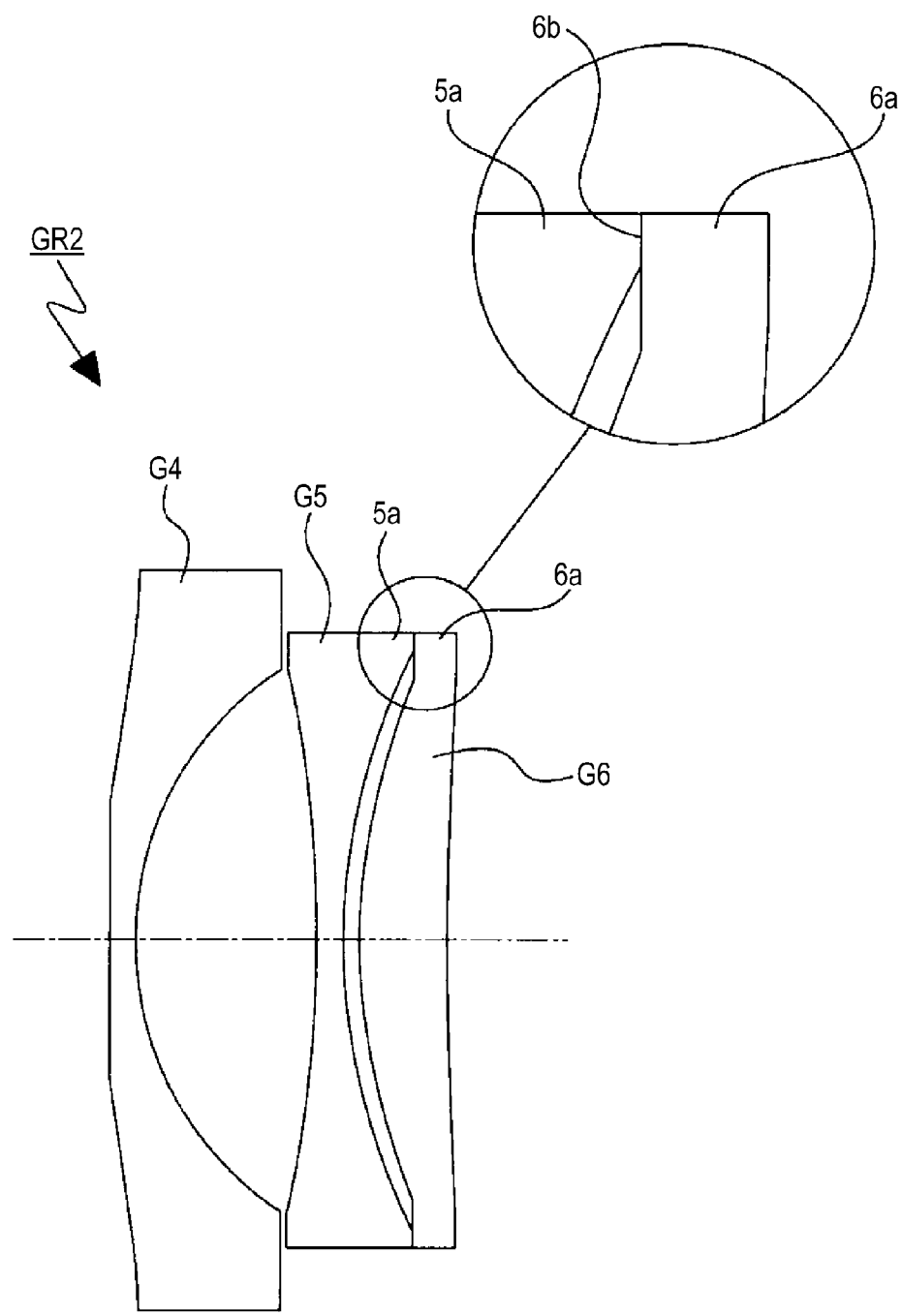
FIG. 2 is an enlarged view illustrating a state where a second lens group is assembled such that the image side surface of the second negative lens in the outer peripheral portion is in contact with the object side surface of the positive lens in the outer peripheral portion.

In the zoom lens according to the embodiment of the present technology, it is preferable that the outer peripheral portion of the image side surface of the second negative lens of the second lens group is in contact with the outer peripheral portion of the object side surface of the positive lens (refer to FIG. 2).

The second negative lens G5 and the positive lens G6 disposed on the image side of the first negative lens G4 are separated from each other with a predetermined space in the portion other than the outer peripheral portions 5a and 6a.

However, the second lens group GR2 is configured such that the image side surface of the second negative lens G5 in the outer peripheral portion 5a is in contact with the object side surface of the positive lens G6 in the outer peripheral portion 6a.

As described above, by making the outer peripheral portion of the second negative lens be in contact with the outer peripheral portion of the positive lens, it is possible to secure the tilt accuracy of the positive lens relative to the second negative lens due to the lens molding accuracy. Accordingly, for example, comparing with the case where two lenses can be assembled with a resin member interposed therebetween, the relative tilt accuracy at the time of assembly is greatly improved by using the respective outer peripheral portions. Hence, in particular, it is possible to suppress the occurrence of eccentric aberration at the telephoto end. As a result, it is possible to improve image quality.

In addition, generally, in the case of the zoom lens having the first to third lens groups of positive, negative, and positive arranged in order from the object side to the image side, the second lens group and the third lens group are lens groups most contributing to the power variation. Hence, the refractive power tends to be maximized, and simultaneously aberration correction in such a lens group is important in achieving improvement of image quality in the entire zoom range.

Accordingly, forming an aspheric surface on the positive lens of the second lens group is extremely effective for aberration correction in terms of improvement of image quality. Meanwhile, since it is difficult to reduce the sensitivity of eccentricity at the time of manufacture, in order to reduce the sensitivity of eccentricity, it is effective that the assembly is performed in a state where the outer peripheral portions of the respective lenses are in contact with each other as described above.

In the zoom lens according to the embodiment of the present technology, it is preferable that the outer peripheral portion of the object side surface of the positive lens is formed as a flat surface perpendicular to the optical axis, and the flat surface of the positive lens is in contact with the outer peripheral portion of the image side surface of the second negative lens (refer to FIG. 2).

The image side surface of the positive lens G6 in the outer peripheral portion 6a is formed as the flat surface 6b perpendicular to the optical axis. In addition, the second lens group is configured such that the outer peripheral portion 5a of the second negative lens G5 is in contact with the flat surface 6b of the positive lens G6.

As described above, by making the outer peripheral portion of the second negative lens be in contact with the flat surface of the positive lens, due to vibration caused in use of the imaging apparatus and the like, the positive lens may be displaced relative to the second negative lens in a direction orthogonal to the optical axis. In this case, it is possible to suppress deterioration in relative tilt accuracy.

In addition, the above-mentioned configuration of Conditional Expressions (1) and (2) is effective for implementing a method capable of performing assembly in a state where the above-mentioned second negative lens is in contact with a portion of the positive lens.

That is, when the upper limit of Conditional Expression (1) is exceeded, the position of the contact between the second negative lens and the positive lens is excessively distanced from the optical axis. Hence, the size of the second lens group diametrically increases.

Further, when the upper limit of Conditional Expression (2) is exceeded, the space between the image side surface of the second negative lens and the object side surface of the positive lens excessively increases. Hence, the position of the contact between the second negative lens and the positive lens is excessively distanced from the optical axis, and thus the size of the second lens group also diametrically increases.

In the zoom lens according to the embodiment of the present technology, it is preferable that the positive lens of the second lens group is formed of a glass material through molding.

Since the positive lens of the second lens group is formed of a glass material through molding, the positive lens can be formed with high accuracy through the molding accuracy. Thus, it is possible to secure high accuracy in assembly between the positive lens and the second negative lens.

In the zoom lens according to the embodiment of the present technology, it is preferable that during zooming from the wide-angle end to the telephoto end, the first lens group is shifted to the object side so as to be distanced from the second lens group, and the third lens group is shifted to the object side so as to come close to the second lens group.

With such a configuration of the zoom lens, it is possible to maximize the effect of the power variation of the second lens group and the third lens group which greatly contribute to the effect of the power variation during the zooming, and it is possible to achieve a decrease in size by shortening the total length of the optical system.

[Numerical Examples of Zoom Lens]

The following description will be given of specific embodiments of the zoom lens according to the present technology and Numerical Examples, in which specific numerical values are applied to the embodiments, with reference to the accompanying drawings and tables.

In addition, in the following tables and description, the reference signs and the like are defined as follows.

"si" represents an i-th surface counted from the object side to the image side, "ri" represents a paraxial radius of curvature of the i-th surface, "di" represents an on-axis surface space between the i-th surface and an (i+1)th surface (the thickness or the air gap at the center of the lens), "ni" represents a refractive index of a lens and the like from the i-th surface at the d-line ($\lambda=587.6$ nm), and "vi" represents an Abbe number of the lens and the like from the i-th surface at the d-line.

Regarding "si", "ASP" represents that the corresponding surface is aspheric, and regarding "ri", "INFINITY" represents that the corresponding surface is planar.

"f" represents a focal length, "Fno" represents an F number, and "$\omega$" represents a half viewing angle.

"K" represents a conic constant, and "A", "B", "C", and "D" respectively represent 4th-order, 6th-order, 8th-order, and 10th-order aspheric surface coefficients.

In addition, in the respective tables showing the aspheric surface coefficients to be described below, the reference sign "E-n" represents an exponential expression having a base of 10, that is, "$10^{-n}$". For example, "0.12345E-05" represents "$0.12345\times10^{-5}$".

Some zoom lenses used in the embodiments are configured so that the lens surface is formed to be aspheric. Here, it is assumed that "x" is the distance (the sag amount) from the vertex of the lens surface in the direction of the optical axis, "y" is the height (the image height) in the direction perpendicular to the direction of the optical axis, "c" is the paraxial radius of curvature (the inverse of the radius of curvature) at the vertex of the lens, "K" is the conic constant, and "A", "B", "C", and "D" are respectively the 4th-order, 6th-order, 8th-order, and 10th-order aspheric surface coefficients, the aspheric surface shape is defined as the following Numerical Expression 1.

$$x = \frac{cy^2}{1 + \{1 - (1+\kappa)c^2 y^2\}^{1/2}} + Ay^4 + By^6 + \ldots$$

FIGS. 3, 6, 9, 12, 15, 18, 21, and 24 respectively show lens configurations of zoom lenses 1 to 8 according to first to eighth embodiments of the present technology.

In the respective drawings, each arrow represents a direction of the shift during zooming.

First Embodiment

Figure 3:
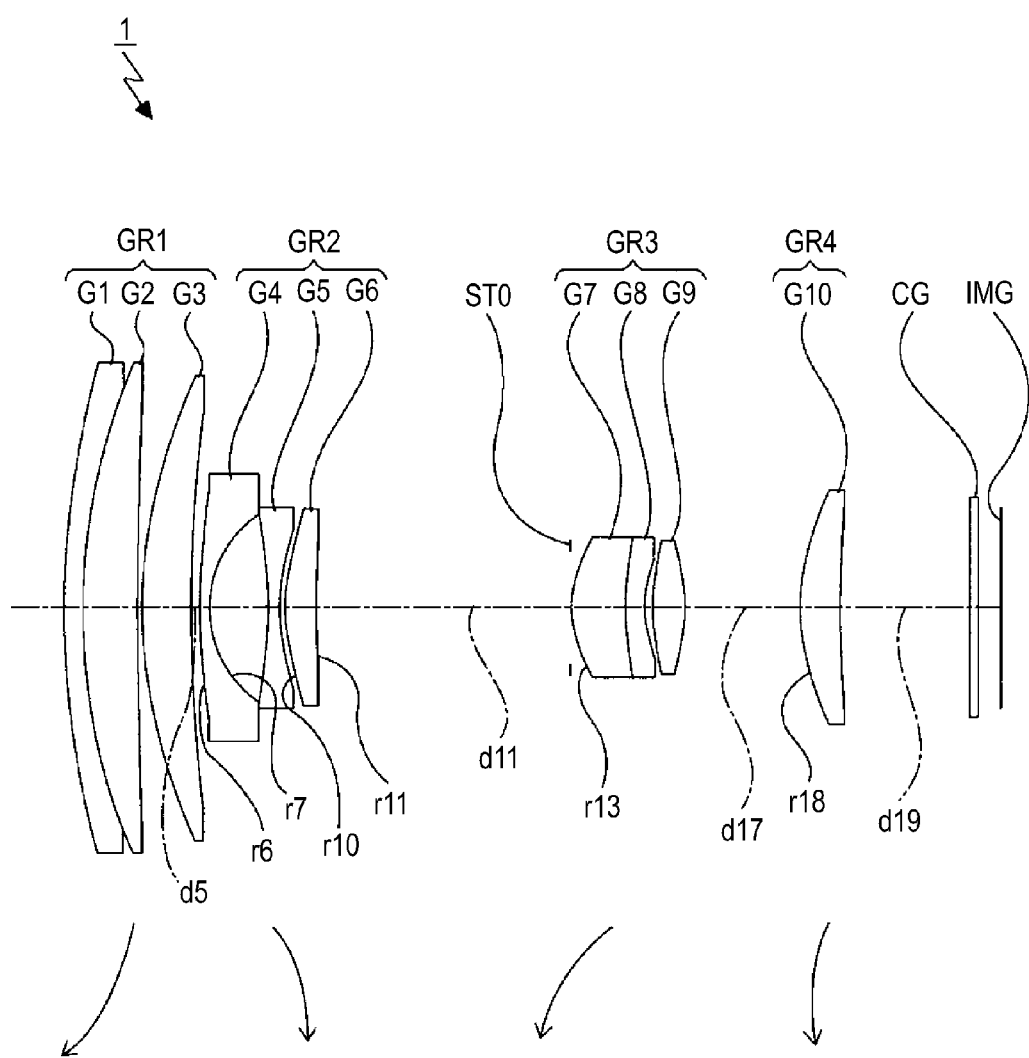
FIG. 3 is a diagram illustrating a lens configuration of a zoom lens according to a first embodiment.

FIG. 3 shows a lens configuration of a zoom lens 1 according to the first embodiment of the present technology.

The zoom lens 1 includes, in order from the object side to the image side: a first lens group GR1 with a positive refractive power; a second lens group GR2 with a negative refractive power; a third lens group GR3 with a positive refractive power; and a fourth lens group GR4 with a positive refractive power.

The zoom lens 1 has a zoom ratio of 10.8 magnifications.

The first lens group GR1 includes, in order from the object side to the image side: a cemented lens that is formed by cementing a negative lens G1, which is convex toward the object side and has a meniscus shape, and a positive lens G2 which has a biconvex shape; and a positive lens G3 that is convex toward the object side and has a meniscus shape.

The second lens group GR2 includes, in order from the object side to the image side: a first negative lens G4 that is convex toward the object side and has a meniscus shape; a second negative lens G5 that has a biconcave shape; and a positive lens G6 that is convex toward the object side and has a meniscus shape.

Although not shown in the drawing, the second lens group GR2 is configured such that the outer peripheral portion of the image side surface of the second negative lens G5 is in contact with the outer peripheral portion of the object side surface of the positive lens G6.

The outer peripheral portion of the object side surface of the positive lens G6 is formed as a flat surface perpendicular to the optical axis, and the flat surface is in contact with the outer peripheral portion of the image side surface of the second negative lens G5.

The third lens group GR3 includes, in order from the object side to the image side: a cemented lens that is formed by cementing a positive lens G7, which is convex toward the object side and has a meniscus shape, and a negative lens G8 which is concave toward the image side and has a meniscus shape; and a positive lens G9 that has a biconvex shape.

The fourth lens group GR4 includes a positive lens G10 that is convex toward the object side and has a meniscus shape.

A cover glass CG is disposed between the fourth lens group GR4 and an image plane IMG. In addition, various filters such as an infrared cut filter may be disposed between the image plane IMG and the cover glass CG, and the cover glass CG may be configured to have same functions of the infrared cut filter and the like.

An aperture stop STO is disposed near the object side of the third lens group GR3, and is shifted integrally with the third lens group.

Table 1 shows the lens data of Numerical Example 1 of the zoom lens 1, to which specific numerical values are applied, according to the first embodiment.

TABLE 1

| si | ri | di | ni | vi |
|---|---|---|---|---|
| 1 | 38.931 | 0.700 | 1.92286 | 20.880 |
| 2 | 24.694 | 2.319 | 1.59282 | 68.624 |
| 3 | 307.961 | 0.150 | | |
| 4 | 21.627 | 2.009 | 1.72916 | 54.674 |
| 5 | 65.674 | (d5) | | |
| 6 (ASP) | 186.547 | 0.400 | 1.80139 | 45.450 |
| 7 (ASP) | 5.402 | 2.502 | | |
| 8 | −21.500 | 0.450 | 1.80420 | 46.503 |
| 9 | 9.637 | 0.200 | | |
| 10 (ASP) | 8.000 | 1.290 | 2.00170 | 19.324 |
| 11 (ASP) | 25.608 | (d11) | | |
| STO | INFINITY | 0.000 | | |
| 13 (ASP) | 4.724 | 2.250 | 1.68893 | 31.161 |
| 14 | 12.655 | 0.750 | 1.94595 | 17.980 |
| 15 | 4.886 | 0.355 | | |
| 16 | 10.394 | 1.320 | 1.61800 | 63.390 |
| 17 | −10.394 | (d17) | | |
| 18 (ASP) | 10.719 | 1.600 | 1.49710 | 81.560 |
| 19 | 50.000 | (d19) | | |
| 20 | INFINITY | 0.300 | 1.51680 | 64.200 |
| 21 | INFINITY | 1.000 | | |
| IMG | INFINITY | | | |

In the zoom lens 1, during the power variation between the wide-angle end state and the telephoto end state, changes occur in an on-axis surface space d5 between the first lens group GR1 and the second lens group GR2, the on-axis surface space d11 between the second lens group GR2 and the third lens group GR3, an on-axis surface space d17 between the third lens group GR3 and the fourth lens group GR4, and an on-axis surface space d19 between the fourth lens group GR4 and the cover glass CG.

Table 2 shows, together with the F number Fno and the half viewing angle ω, variable spaces at the wide-angle end state, the middle focal length state, and the telephoto end state in Numerical Example 1.

TABLE 2

| f | 4.80 | 15.68 | 51.78 |
|---|---|---|---|
| Fno | 2.88 | 3.85 | 4.60 |
| ω | 40.63 | 13.87 | 4.21 |
| d5 | 0.350 | 10.037 | 18.992 |
| d11 | 10.550 | 3.528 | 0.400 |
| d17 | 4.830 | 6.995 | 16.301 |
| d19 | 5.384 | 9.736 | 4.713 |

In the zoom lens 1, both surfaces (sixth surface and seventh surface) of the first negative lens G4 of the second lens group GR2, both surfaces (tenth surface and eleventh surface) of the positive lens G6, the object side surface (thirteenth surface) of the positive lens G7 of the third lens group GR3, and the object side surface (eighteenth surface) of the positive lens G10 of the fourth lens group GR4 are formed as aspheric surfaces. Table 3 shows, together with the conic constant K, the 4th-order, 6th-order, 8th-order, and 10th-order aspheric surface coefficients A, B, C, and D of the aspheric surfaces in Numerical Example 1.

TABLE 3

| si | K | A | B | C | D |
|---|---|---|---|---|---|
| 6 | −6.77554E+00 | 2.27088E−03 | −1.23885E−04 | 2.74355E−06 | −2.44033E−08 |
| 7 | 0.00000E+00 | 2.27171E−03 | 1.89868E−05 | 3.25971E−06 | −4.67720E−07 |
| 10 | 2.03508E+00 | −2.02242E−03 | 1.24485E−04 | −8.09854E−06 | 0.00000E+00 |
| 11 | 0.00000E+00 | −1.29065E−03 | 1.04114E−04 | −6.95652E−06 | 1.16616E−07 |
| 13 | 0.00000E+00 | −7.93622E−04 | −5.01239E−06 | −1.30555E−06 | 0.00000E+00 |
| 18 | 0.00000E+00 | −7.14427E−05 | 2.36706E−06 | −1.83600E−08 | −7.77964E−10 |

Figure 4:
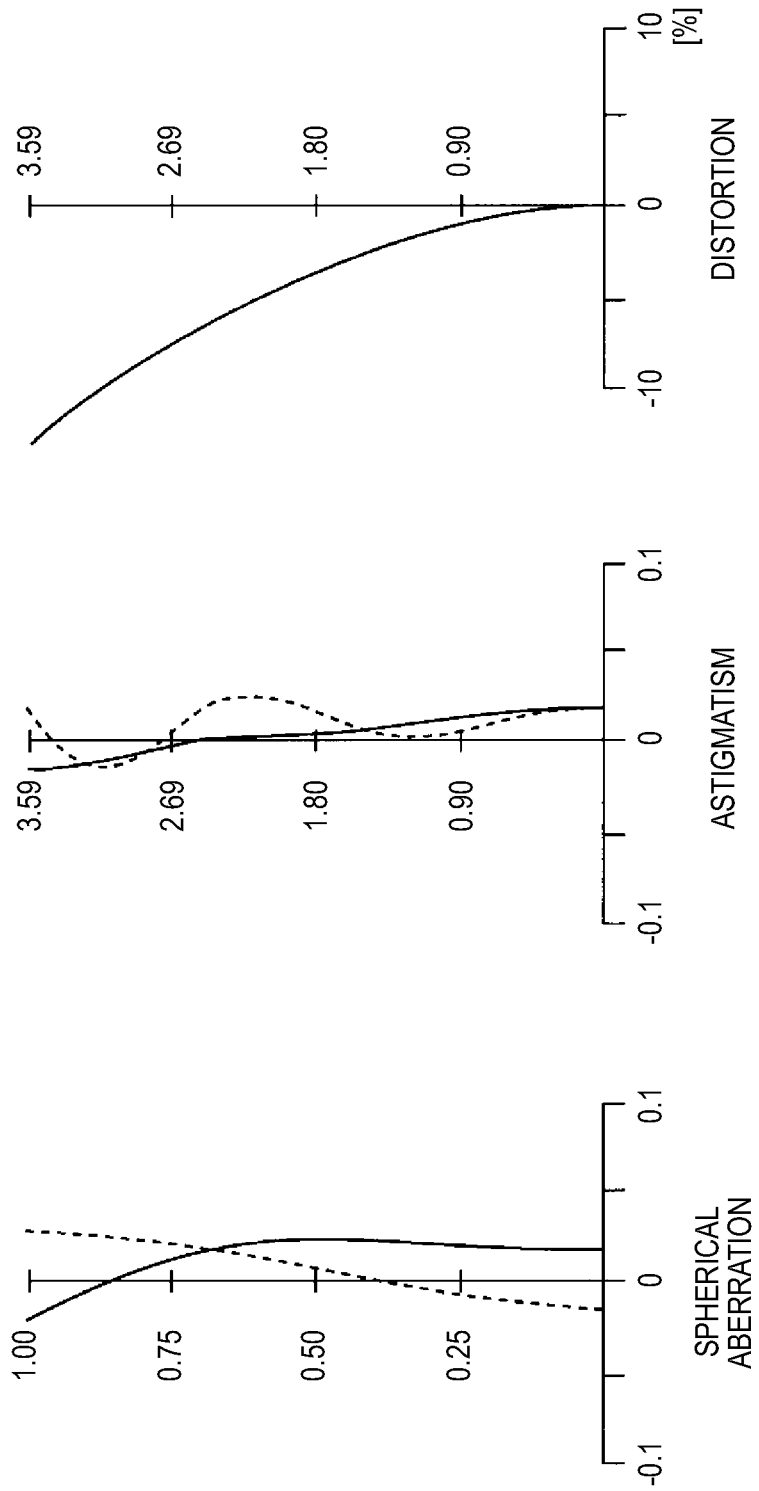
FIG. 4 shows, similarly to FIG. 5, an aberration diagram of a numerical example in which specific numerical values are applied to the first embodiment, and the drawing is a diagram illustrating spherical aberration, astigmatism, and distortion in a wide-angle end state.
Figure 5:
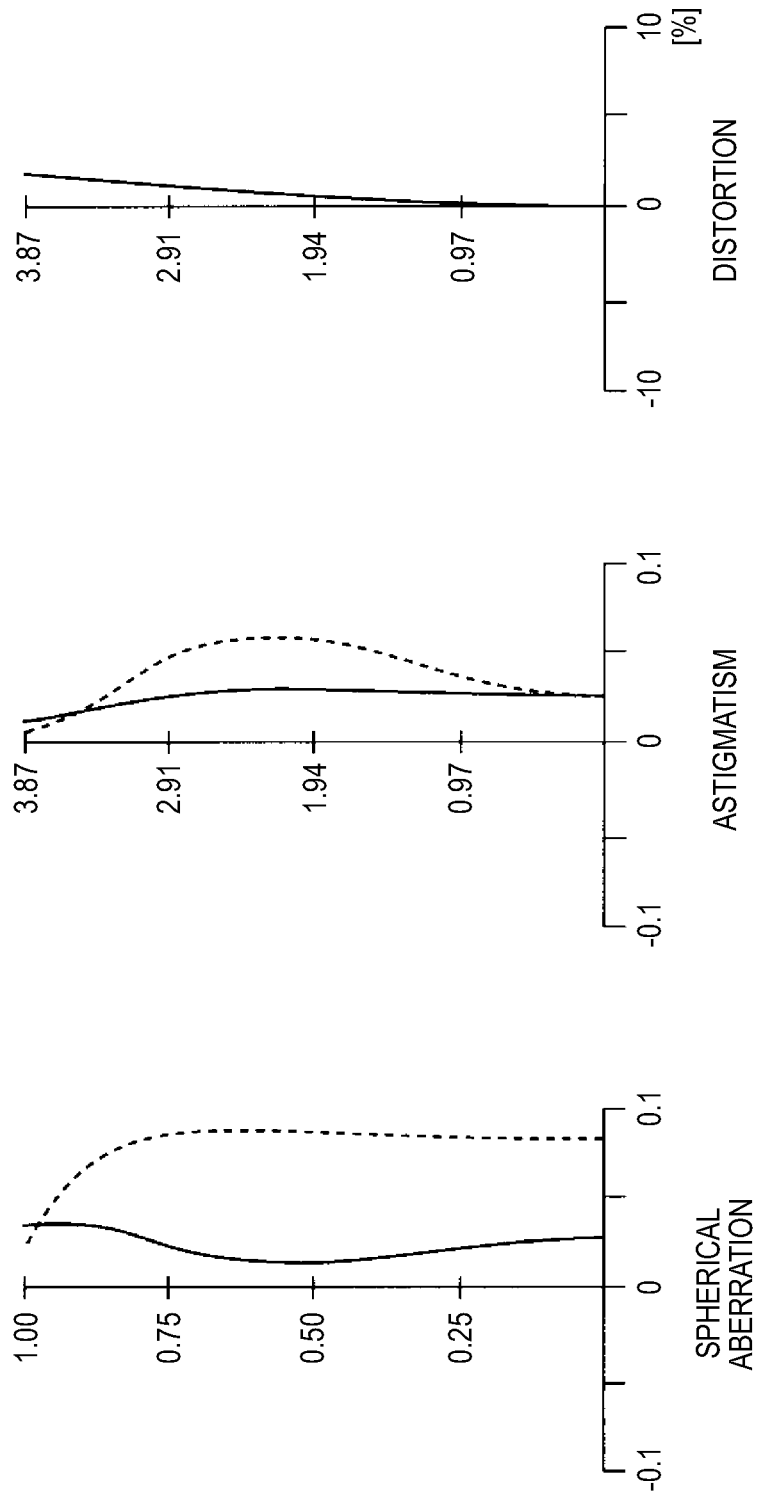
FIG. 5 is a diagram illustrating spherical aberration, astigmatism, and distortion in a telephoto end state.

FIGS. 4 and 5 show diagrams of various aberrations in a state where the focus is at infinity in Numerical Example 1, where FIG. 4 shows a diagram of various aberrations at the wide-angle end state and FIG. 5 shows a diagram of various aberrations at the telephoto end state.

In each spherical aberration diagram of FIGS. 4 and 5, the solid line represents the d-line (the wavelength of 587.6 nm), and the dashed line represents the g-line (the wavelength of 435.8 nm). In each astigmatism diagram, the solid line represents a value on the sagittal image plane, and the dotted line shows a value on the meridional image plane.

As can be clearly seen from the aberration diagrams, in Numerical Example 1, it is possible to obtain an excellent imaging performance by satisfactorily correcting various aberrations.

Second Embodiment

Figure 6:
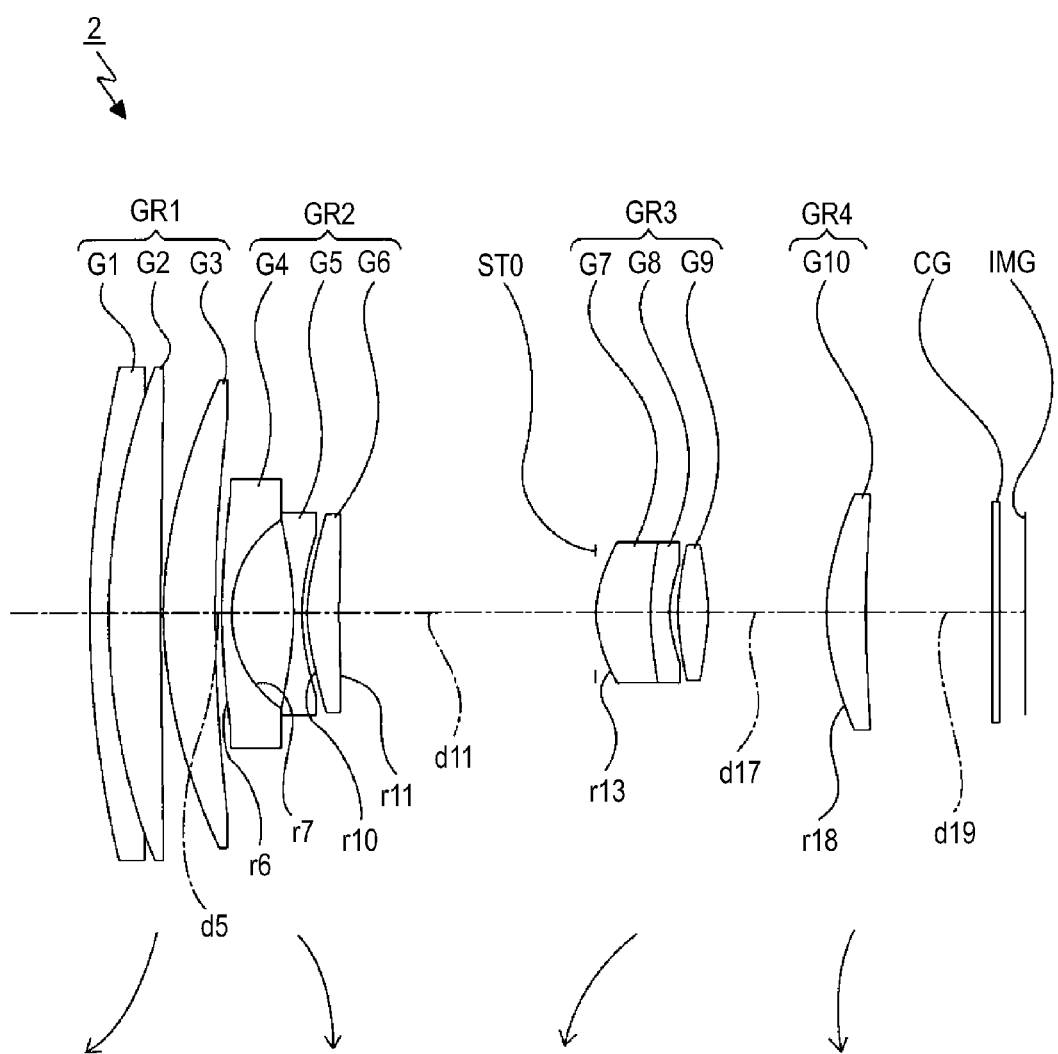
FIG. 6 is a diagram illustrating a lens configuration of a zoom lens according to a second embodiment.

FIG. 6 shows a lens configuration of a zoom lens 2 according to the second embodiment of the present technology.

The zoom lens 2 includes, in order from the object side to the image side: a first lens group GR1 with a positive refractive power; a second lens group GR2 with a negative refractive power; a third lens group GR3 with a positive refractive power; and a fourth lens group GR4 with a positive refractive power.

The zoom lens 2 has a zoom ratio of 10.8 magnifications.

The first lens group GR1 includes, in order from the object side to the image side: a cemented lens that is formed by cementing a negative lens G1, which is convex toward the object side and has a meniscus shape, and a positive lens G2 which has a biconvex shape; and a positive lens G3 that is convex toward the object side and has a meniscus shape.

The second lens group GR2 includes, in order from the object side to the image side: a first negative lens G4 that is convex toward the object side and has a meniscus shape; a second negative lens G5 that has a biconcave shape; and a positive lens G6 that is convex toward the object side and has a meniscus shape.

Although not shown in the drawing, the second lens group GR2 is configured such that the outer peripheral portion of the image side surface of the second negative lens G5 is in contact with the outer peripheral portion of the object side surface of the positive lens G6.

The outer peripheral portion of the object side surface of the positive lens G6 is formed as a flat surface perpendicular to the optical axis, and the flat surface is in contact with the outer peripheral portion of the image side surface of the second negative lens G5.

The third lens group GR3 includes, in order from the object side to the image side: a cemented lens that is formed by cementing a positive lens G7, which is convex toward the object side and has a meniscus shape, and a negative lens G8 which is concave toward the image side and has a meniscus shape; and a positive lens G9 that has a biconvex shape.

The fourth lens group GR4 includes a positive lens G10 that is convex toward the object side and has a meniscus shape.

A cover glass CG is disposed between the fourth lens group GR4 and an image plane IMG. In addition, various filters such as an infrared cut filter may be disposed between the image plane IMG and the cover glass CG, and the cover glass CG may be configured to have same functions of the infrared cut filter and the like.

An aperture stop STO is disposed near the object side of the third lens group GR3, and is shifted integrally with the third lens group.

Table 4 shows the lens data of Numerical Example 2 of the zoom lens 2, to which specific numerical values are applied, according to the second embodiment.

TABLE 4

| si | ri | di | ni | vi |
|---|---|---|---|---|
| 1 | 42.750 | 0.700 | 1.92286 | 20.880 |
| 2 | 26.121 | 2.268 | 1.59282 | 68.624 |
| 3 | 499.927 | 0.150 | | |
| 4 | 21.631 | 2.025 | 1.72916 | 54.674 |
| 5 | 67.685 | (d5) | | |
| 6 (ASP) | 795.746 | 0.400 | 1.80139 | 45.450 |
| 7 (ASP) | 5.720 | 2.461 | | |
| 8 | −21.750 | 0.450 | 1.80420 | 46.503 |
| 9 | 10.250 | 0.200 | | |
| 10 (ASP) | 7.800 | 1.252 | 1.94595 | 17.980 |
| 11 (ASP) | 22.185 | (d11) | | |
| STO | INFINITY | 0.000 | | |
| 13 (ASP) | 4.672 | 2.150 | 1.68893 | 31.161 |
| 14 | 12.596 | 0.800 | 1.94595 | 17.980 |
| 15 | 4.850 | 0.340 | | |
| 16 | 10.316 | 1.230 | 1.61800 | 63.390 |
| 17 | −10.316 | (d17) | | |
| 18 (ASP) | 10.717 | 1.575 | 1.49710 | 81.560 |
| 19 | 50.000 | (d19) | | |
| 20 | INFINITY | 0.300 | 1.51680 | 64.200 |
| 21 | INFINITY | 1.000 | | |
| IMG | INFINITY | | | |

In the zoom lens 2, during the power variation between the wide-angle end state and the telephoto end state, changes occur in an on-axis surface space d5 between the first lens group GR1 and the second lens group GR2, the on-axis surface space d11 between the second lens group GR2 and the third lens group GR3, an on-axis surface space d17 between the third lens group GR3 and the fourth lens group GR4, and an on-axis surface space d19 between the fourth lens group GR4 and the cover glass CG.

Table 5 shows, together with the F number Fno and the half viewing angle ω, variable spaces at the wide-angle end state, the middle focal length state, and the telephoto end state in Numerical Example 2.

TABLE 5

| f | 4.80 | 15.54 | 51.67 |
|---|---|---|---|
| Fno | 2.89 | 3.81 | 4.66 |
| ω | 40.85 | 14.01 | 4.21 |
| d5 | 0.350 | 10.049 | 19.152 |
| d11 | 10.550 | 3.481 | 0.400 |
| d17 | 4.917 | 6.498 | 16.447 |
| d19 | 5.194 | 9.752 | 4.464 |

In the zoom lens 2, both surfaces (sixth surface and seventh surface) of the first negative lens G4 of the second lens group GR2, both surfaces (tenth surface and eleventh surface) of the positive lens G6, the object side surface (thirteenth surface) of the positive lens G7 of the third lens group GR3, and the object side surface (eighteenth surface) of the positive lens G10 of the fourth lens group GR4 are formed as aspheric surfaces. Table 6 shows, together with the conic constant K, the 4th-order, 6th-order, 8th-order, and 10th-order aspheric surface coefficients A, B, C, and D of the aspheric surfaces in Numerical Example 2.

TABLE 6

| si | K | A | B | C | D |
|---|---|---|---|---|---|
| 6 | 1.34053E+01 | 2.22759E−03 | −1.11778E−04 | 2.25695E−06 | −1.80150E−08 |
| 7 | 0.00000E+00 | 2.19428E−03 | 1.92410E−05 | 4.09356E−06 | −4.54139E−07 |
| 10 | 1.71866E+00 | −2.18187E−03 | 1.30981E−04 | −8.25137E−06 | 0.00000E+00 |
| 11 | 0.00000E+00 | −1.38097E−03 | 1.01622E−04 | −6.74912E−06 | 9.86458E−08 |
| 13 | 0.00000E+00 | −8.07334E−04 | −8.36065E−06 | −1.33902E−06 | 0.00000E+00 |
| 18 | 0.00000E+00 | −7.95246E−05 | 3.26402E−06 | −5.67677E−08 | −1.94570E−10 |

Figure 7:
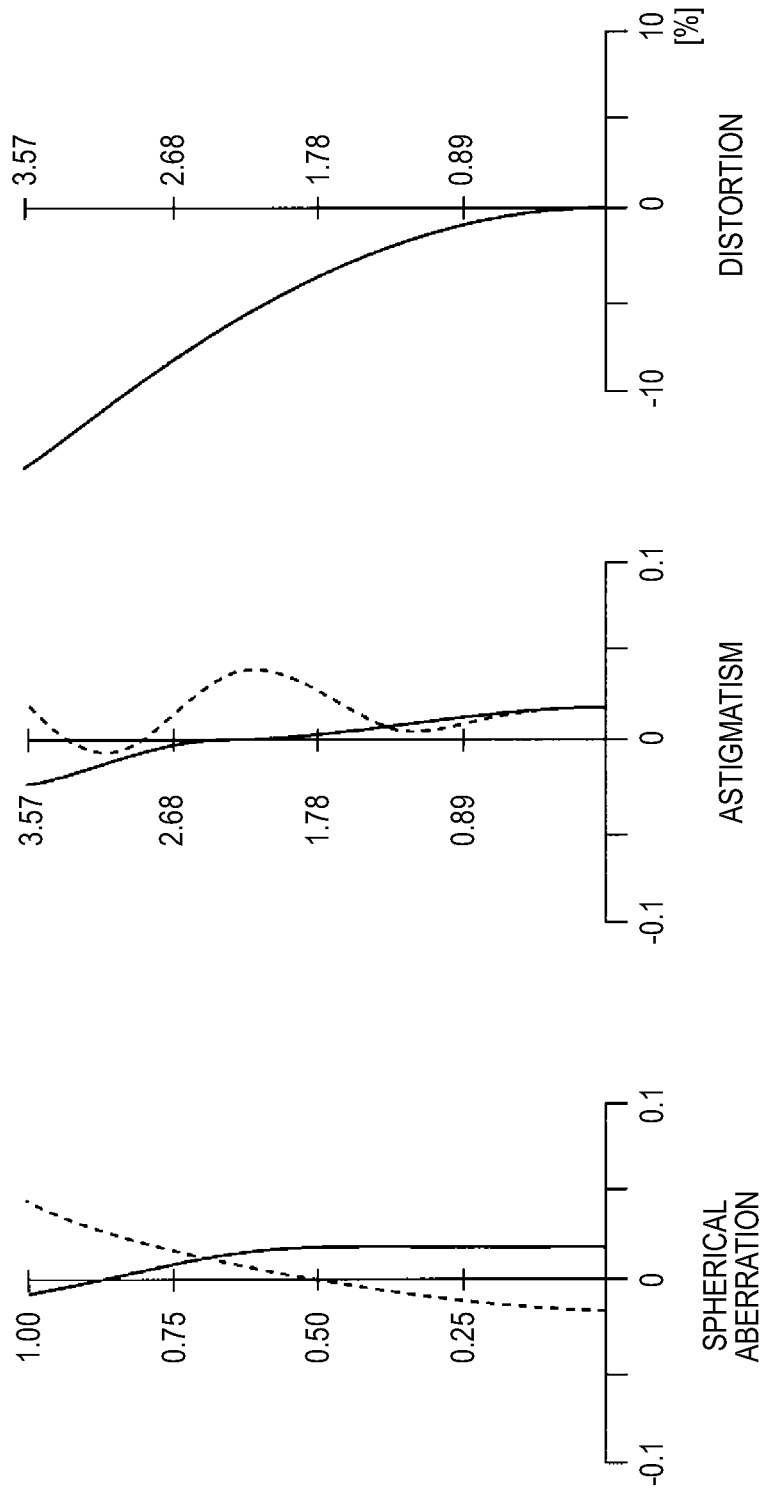
FIG. 7 shows, similarly to FIG. 8, an aberration diagram of a numerical example in which specific numerical values are applied to the second embodiment, and the drawing is a diagram illustrating spherical aberration, astigmatism, and distortion in the wide-angle end state.
Figure 8:
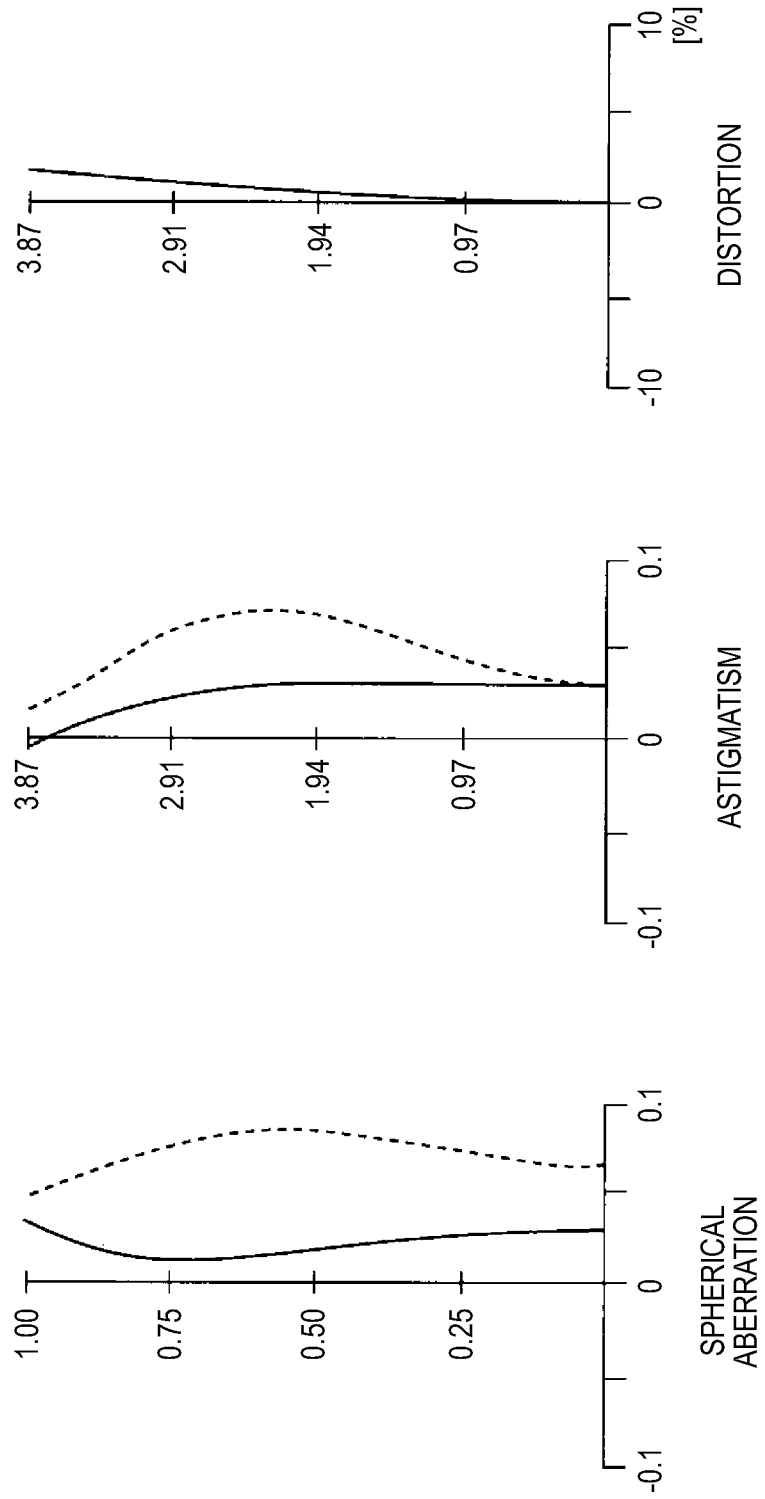
FIG. 8 is a diagram illustrating spherical aberration, astigmatism, and distortion in the telephoto end state.

FIGS. 7 and 8 show diagrams of various aberrations in a state where the focus is at infinity in Numerical Example 2, where FIG. 7 shows a diagram of various aberrations at the wide-angle end state and FIG. 8 shows a diagram of various aberrations at the telephoto end state.

In each spherical aberration diagram of FIGS. 7 and 8, the solid line represents the d-line (the wavelength of 587.6 nm), and the dashed line represents the g-line (the wavelength of 435.8 nm). In each astigmatism diagram, the solid line represents a value on the sagittal image plane, and the dotted line shows a value on the meridional image plane.

As can be clearly seen from the aberration diagrams, in Numerical Example 2, it is possible to obtain an excellent imaging performance by satisfactorily correcting various aberrations.

Third Embodiment

Figure 9:
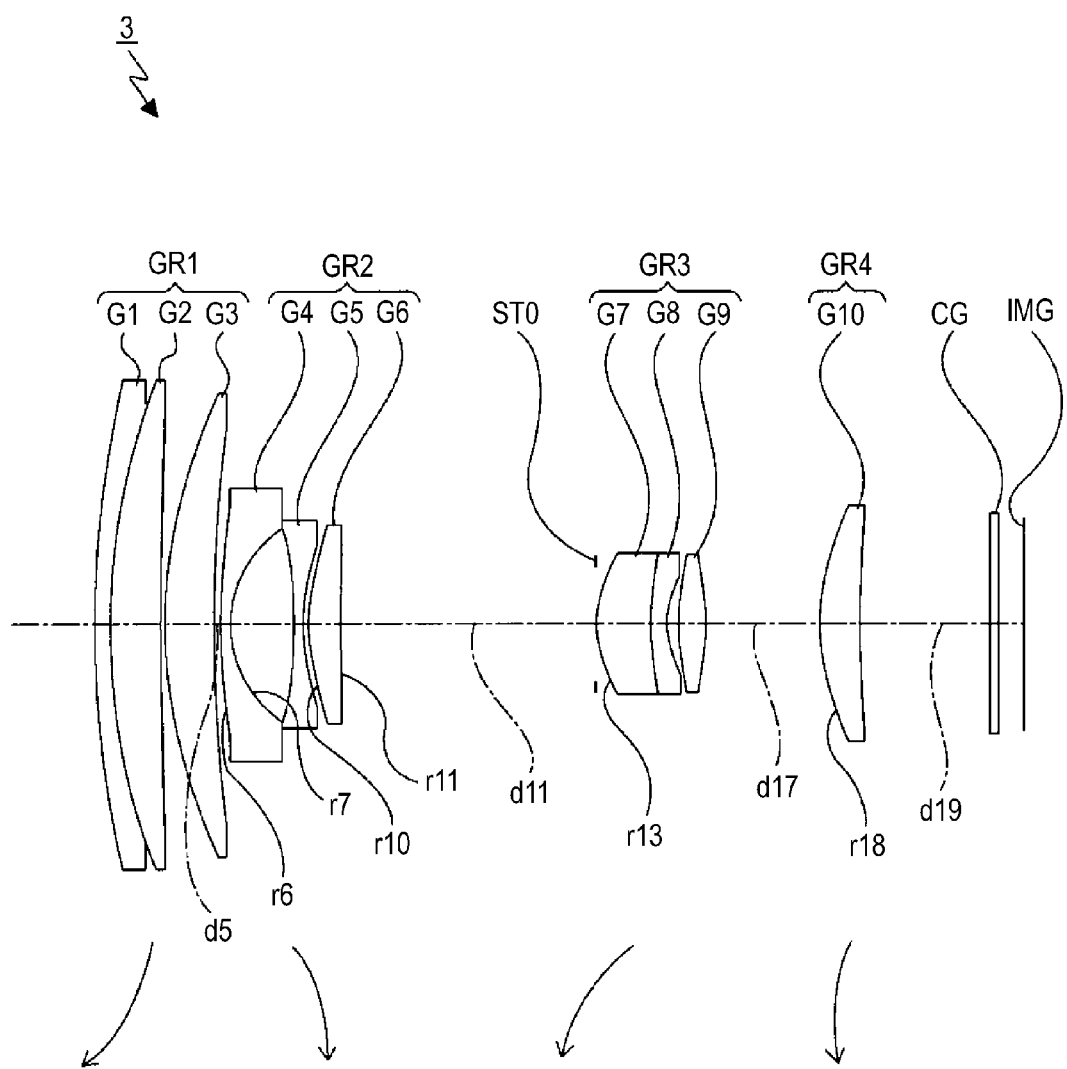
FIG. 9 is a diagram illustrating a lens configuration of a zoom lens according to a third embodiment.

FIG. 9 shows a lens configuration of a zoom lens 3 according to the third embodiment of the present technology.

The zoom lens 3 includes, in order from the object side to the image side: a first lens group GR1 with a positive refractive power; a second lens group GR2 with a negative refractive power; a third lens group GR3 with a positive refractive power; and a fourth lens group GR4 with a positive refractive power.

The zoom lens 3 has a zoom ratio of 9.0 magnifications.

The first lens group GR1 includes, in order from the object side to the image side: a cemented lens that is formed by cementing a negative lens G1, which is convex toward the object side and has a meniscus shape, and a positive lens G2 which has a biconvex shape; and a positive lens G3 that is convex toward the object side and has a meniscus shape.

The second lens group GR2 includes, in order from the object side to the image side: a first negative lens G4 that is convex toward the object side and has a meniscus shape; a second negative lens G5 that has a biconcave shape; and a positive lens G6 that is convex toward the object side and has a meniscus shape.

Although not shown in the drawing, the second lens group GR2 is configured such that the outer peripheral portion of the image side surface of the second negative lens G5 is in contact with the outer peripheral portion of the object side surface of the positive lens G6.

The outer peripheral portion of the object side surface of the positive lens G6 is formed as a flat surface perpendicular to the optical axis, and the flat surface is in contact with the outer peripheral portion of the image side surface of the second negative lens G5.

The third lens group GR3 includes, in order from the object side to the image side: a cemented lens that is formed by cementing a positive lens G7, which is convex toward the object side and has a meniscus shape, and a negative lens G8 which is concave toward the image side and has a meniscus shape; and a positive lens G9 that has a biconvex shape.

The fourth lens group GR4 includes a positive lens G10 that is convex toward the object side and has a meniscus shape.

A cover glass CG is disposed between the fourth lens group GR4 and an image plane IMG. In addition, various filters such as an infrared cut filter may be disposed between the image plane IMG and the cover glass CG, and the cover glass CG may be configured to have same functions of the infrared cut filter and the like.

An aperture stop STO is disposed near the object side of the third lens group GR3, and is shifted integrally with the third lens group.

Table 7 shows the lens data of Numerical Example 3 of the zoom lens 3, to which specific numerical values are applied, according to the third embodiment.

TABLE 7

| si | ri | di | ni | vi |
|---|---|---|---|---|
| 1 | 44.752 | 0.650 | 1.92286 | 20.880 |
| 2 | 27.201 | 2.081 | 1.59282 | 68.624 |
| 3 | 500.000 | 0.150 | | |
| 4 | 21.865 | 1.936 | 1.72916 | 54.674 |
| 5 | 74.276 | (d5) | | |
| 6 (ASP) | 500.000 | 0.400 | 1.80139 | 45.450 |
| 7 (ASP) | 5.456 | 2.469 | | |
| 8 | −24.500 | 0.450 | 1.80420 | 46.503 |
| 9 | 10.562 | 0.200 | | |
| 10 (ASP) | 8.658 | 1.220 | 2.00170 | 19.324 |
| 11 (ASP) | 25.974 | (d11) | | |
| STO | INFINITY | 0.000 | | |
| 13 (ASP) | 4.680 | 2.200 | 1.68893 | 31.161 |
| 14 | 12.325 | 0.664 | 1.94595 | 17.980 |
| 15 | 4.886 | 0.334 | | |
| 16 | 10.443 | 1.218 | 1.61800 | 63.390 |
| 17 | −10.443 | (d17) | | |
| 18 (ASP) | 10.714 | 1.528 | 1.49710 | 81.560 |
| 19 | 50.000 | (d19) | | |

TABLE 7-continued

| si | ri | di | ni | vi |
|----|----|----|----|-----|
| 20 | INFINITY | 0.300 | 1.51680 | 64.200 |
| 21 | INFINITY | 1.000 | | |
| IMG | INFINITY | | | |

In the zoom lens 3, during the power variation between the wide-angle end state and the telephoto end state, changes occur in an on-axis surface space d5 between the first lens group GR1 and the second lens group GR2, the on-axis surface space d11 between the second lens group GR2 and the third lens group GR3, an on-axis surface space d17 between the third lens group GR3 and the fourth lens group GR4, and an on-axis surface space d19 between the fourth lens group GR4 and the cover glass CG.

Table 8 shows, together with the F number Fno and the half viewing angle ω, variable spaces at the wide-angle end state, the middle focal length state, and the telephoto end state in Numerical Example 3.

TABLE 8

| f | 4.81 | 14.33 | 43.19 |
|---|------|-------|-------|
| Fno | 2.88 | 3.73 | 4.49 |
| ω | 40.79 | 15.03 | 5.03 |
| d5 | 0.350 | 9.479 | 18.179 |
| d11 | 10.450 | 3.578 | 0.350 |
| d17 | 4.643 | 6.126 | 14.090 |
| d19 | 14.090 | 9.293 | 6.581 |

In the zoom lens 3, both surfaces (sixth surface and seventh surface) of the first negative lens G4 of the second lens group GR2, both surfaces (tenth surface and eleventh surface) of the positive lens G6, the object side surface (thirteenth surface) of the positive lens G7 of the third lens group GR3, and the object side surface (eighteenth surface) of the positive lens G10 of the fourth lens group GR4 are formed as aspheric surfaces. Table 9 shows, together with the conic constant K, the 4th-order, 6th-order, 8th-order, and 10th-order aspheric surface coefficients A, B, C, and D of the aspheric surfaces in Numerical Example 3.

TABLE 9

| si | K | A | B | C | D |
|----|---|---|---|---|---|
| 6 | 1.50000E+01 | 2.08023E-03 | -1.07706E-04 | 2.22078E-06 | -1.77981E-08 |
| 7 | 0.00000E+00 | 2.09407E-03 | 2.59388E-05 | 3.66545E-06 | -4.38066E-07 |
| 10 | 2.16289E+00 | -1.87614E-03 | 1.17258E-04 | -7.07145E-06 | 0.00000E+00 |
| 11 | 0.00000E+00 | -1.30268E-03 | 9.31696E-05 | -6.24858E-06 | 9.50005E-08 |
| 13 | 0.00000E+00 | -7.85330E-04 | -1.27914E-05 | -8.01349E-07 | 0.00000E+00 |
| 18 | 0.00000E+00 | -1.26701E-04 | 2.54232E-06 | 3.77171E-08 | -4.36322E-09 |

Figure 10:
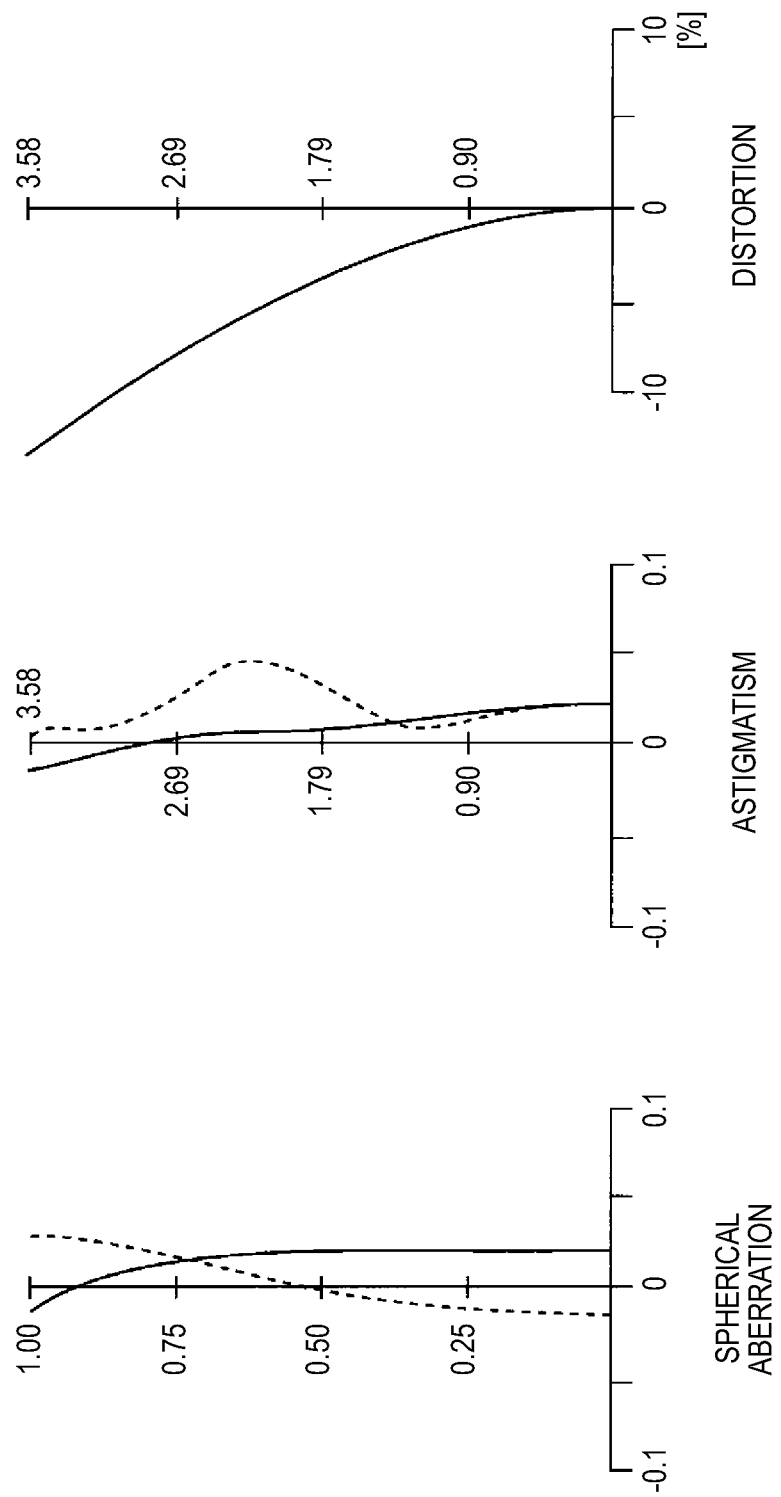
FIG. 10 shows, similarly to FIG. 11, an aberration diagram of a numerical example in which specific numerical values are applied to the third embodiment, and the drawing is a diagram illustrating spherical aberration, astigmatism, and distortion in the wide-angle end state.
Figure 11:
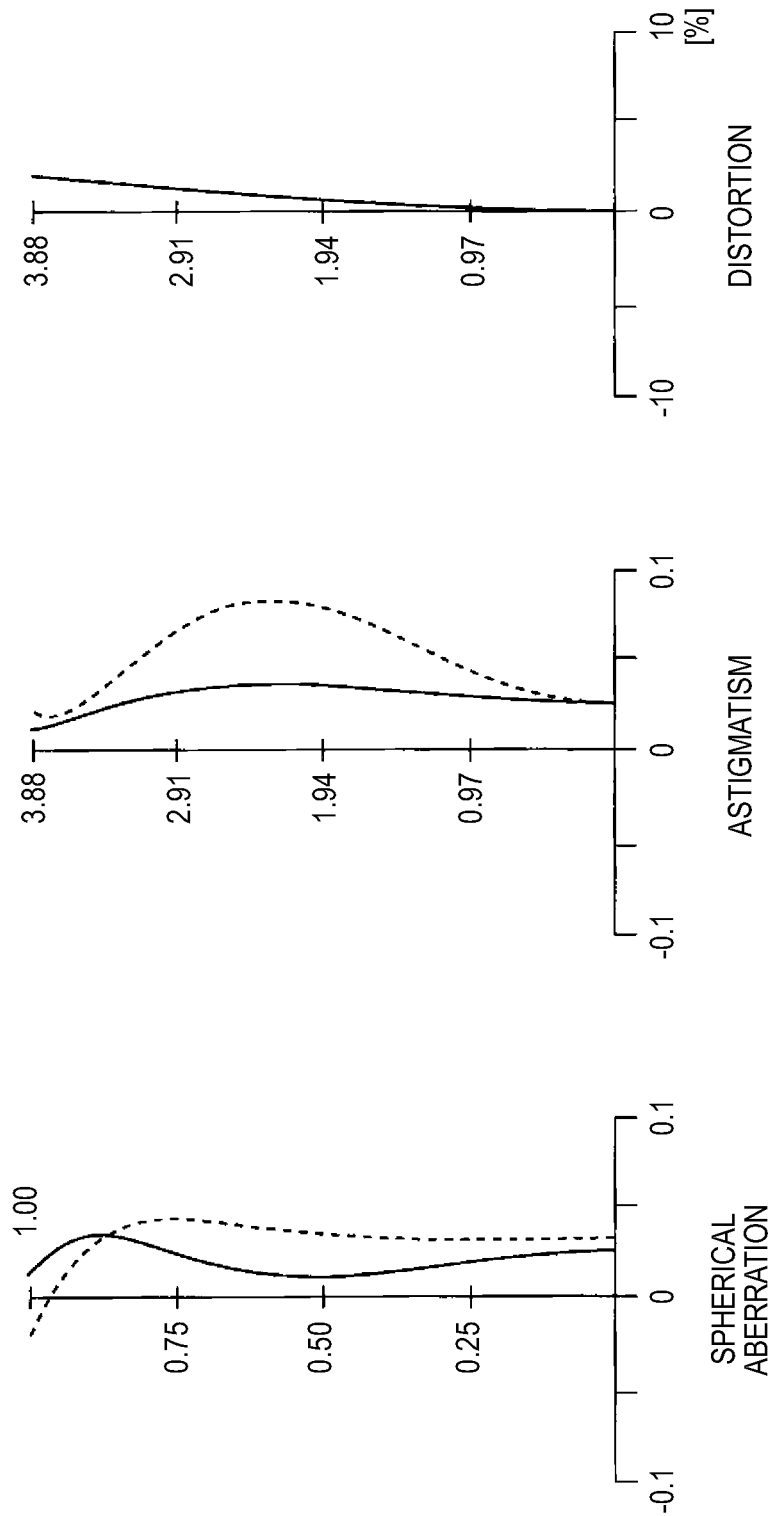
FIG. 11 is a diagram illustrating spherical aberration, astigmatism, and distortion in the telephoto end state.

FIGS. 10 and 11 show diagrams of various aberrations in a state where the focus is at infinity in Numerical Example 3, where FIG. 10 shows a diagram of various aberrations at the wide-angle end state and FIG. 11 shows a diagram of various aberrations at the telephoto end state.

In each spherical aberration diagram of FIGS. 10 and 11, the solid line represents the d-line (the wavelength of 587.6 nm), and the dashed line represents the g-line (the wavelength of 435.8 nm). In each astigmatism diagram, the solid line represents a value on the sagittal image plane, and the dotted line shows a value on the meridional image plane.

As can be clearly seen from the aberration diagrams, in Numerical Example 3, it is possible to obtain an excellent imaging performance by satisfactorily correcting various aberrations.

Fourth Embodiment

Figure 12:
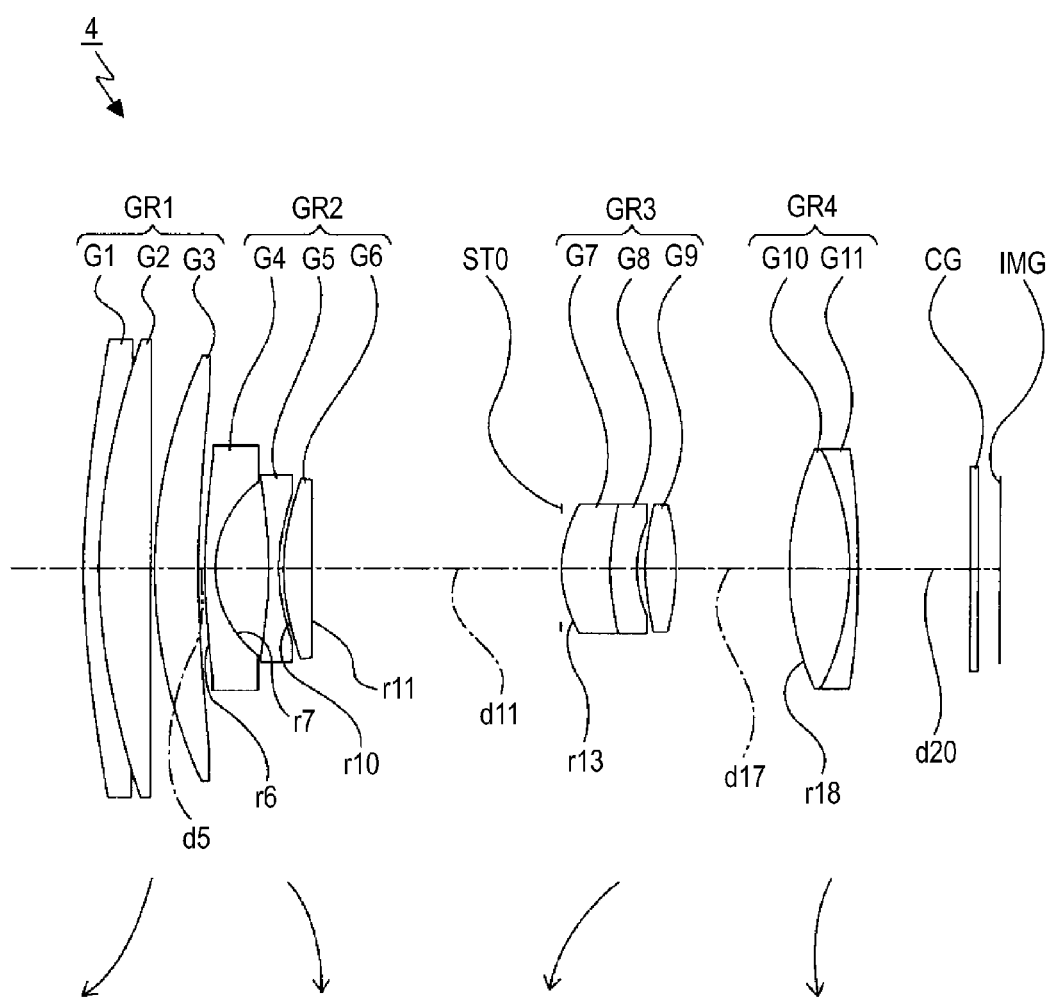
FIG. 12 is a diagram illustrating a lens configuration of a zoom lens according to a fourth embodiment.

FIG. 12 shows a lens configuration of a zoom lens 4 according to the fourth embodiment of the present technology.

The zoom lens 4 includes, in order from the object side to the image side: a first lens group GR1 with a positive refractive power; a second lens group GR2 with a negative refractive power; a third lens group GR3 with a positive refractive power; and a fourth lens group GR4 with a positive refractive power.

The zoom lens 4 has a zoom ratio of 12.1 magnifications.

The first lens group GR1 includes, in order from the object side to the image side: a cemented lens that is formed by cementing a negative lens G1, which is convex toward the object side and has a meniscus shape, and a positive lens G2 which has a biconvex shape; and a positive lens G3 that is convex toward the object side and has a meniscus shape.

The second lens group GR2 includes, in order from the object side to the image side: a first negative lens G4 that is convex toward the object side and has a meniscus shape; a second negative lens G5 that has a biconcave shape; and a positive lens G6 that is convex toward the object side and has a meniscus shape.

Although not shown in the drawing, the second lens group GR2 is configured such that the outer peripheral portion of the image side surface of the second negative lens G5 is in contact with the outer peripheral portion of the object side surface of the positive lens G6.

The outer peripheral portion of the object side surface of the positive lens G6 is formed as a flat surface perpendicular to the optical axis, and the flat surface is in contact with the outer peripheral portion of the image side surface of the second negative lens G5.

The third lens group GR3 includes, in order from the object side to the image side: a cemented lens that is formed by cementing a positive lens G7, which is convex toward the object side and has a meniscus shape, and a negative lens G8 which is concave toward the image side and has a meniscus shape; and a positive lens G9 that has a biconvex shape.

The fourth lens group GR4 includes a cemented lens that is formed by cementing a positive lens G10, which has a biconvex shape, and a negative lens G11 which is concave toward the object side and has a meniscus shape.

A cover glass CG is disposed between the fourth lens group GR4 and an image plane IMG. In addition, various filters such as an infrared cut filter may be disposed between the image plane IMG and the cover glass CG, and the cover glass CG may be configured to have same functions of the infrared cut filter and the like.

An aperture stop STO is disposed near the object side of the third lens group GR3, and is shifted integrally with the third lens group.

Table 10 shows the lens data of Numerical Example 4 of the zoom lens 4, to which specific numerical values are applied, according to the fourth embodiment.

TABLE 10

| si | ri | di | ni | vi |
|---|---|---|---|---|
| 1 | 47.073 | 0.700 | 1.92286 | 20.880 |
| 2 | 28.018 | 2.398 | 1.59282 | 68.624 |
| 3 | −500.000 | 0.150 | | |

TABLE 10-continued

| si | ri | di | ni | vi |
|---|---|---|---|---|
| 4 | 22.134 | 2.002 | 1.72916 | 54.674 |
| 5 | 63.245 | (d5) | | |
| 6 (ASP) | 1000.000 | 0.400 | 1.82080 | 42.706 |
| 7 (ASP) | 5.502 | 2.444 | | |
| 8 | −22.051 | 0.450 | 1.77250 | 49.624 |
| 9 | 9.913 | 0.200 | | |
| 10 (ASP) | 8.130 | 1.320 | 2.00170 | 19.324 |
| 11 (ASP) | 26.075 | (d11) | | |
| STO | INFINITY | 0.000 | | |
| 13 (ASP) | 5.500 | 2.300 | 1.73077 | 40.501 |
| 14 | 14.257 | 1.200 | 1.92286 | 20.880 |
| 15 | 5.486 | 0.332 | | |
| 16 | 11.781 | 1.450 | 1.61800 | 63.390 |
| 17 | −11.781 | (d17) | | |
| 18 (ASP) | 14.000 | 2.750 | 1.59201 | 67.023 |
| 19 | −11.593 | 0.403 | 1.83400 | 37.345 |
| 20 | −35.510 | (d20) | | |
| 21 | INFINITY | 0.300 | 1.51680 | 64.200 |
| 22 | INFINITY | 1.000 | | |
| IMG | INFINITY | | | |

In the zoom lens 4, during the power variation between the wide-angle end state and the telephoto end state, changes occur in an on-axis surface space d5 between the first lens group GR1 and the second lens group GR2, the on-axis surface space d11 between the second lens group GR2 and the third lens group GR3, an on-axis surface space d17 between the third lens group GR3 and the fourth lens group GR4, and an on-axis surface space d20 between the fourth lens group GR4 and the cover glass CG.

Table 11 shows, together with the F number Fno and the half viewing angle ω, variable spaces at the wide-angle end state, the middle focal length state, and the telephoto end state in Numerical Example 4.

TABLE 11

| f | 4.81 | 16.51 | 58.18 |
|---|---|---|---|
| Fno | 2.88 | 3.82 | 4.97 |
| ω | 40.46 | 13.10 | 3.73 |
| d5 | 0.350 | 10.674 | 19.600 |
| d11 | 11.400 | 3.550 | 0.400 |
| d17 | 5.132 | 8.251 | 20.563 |
| d20 | 5.143 | 10.122 | 5.213 |

In the zoom lens 4, both surfaces (sixth surface and seventh surface) of the first negative lens G4 of the second lens group GR2, both surfaces (tenth surface and eleventh surface) of the positive lens G6, the object side surface (thirteenth surface) of the positive lens G7 of the third lens group GR3, and the object side surface (eighteenth surface) of the positive lens G10 of the fourth lens group GR4 are formed as aspheric surfaces. Table 12 shows, together with the conic constant K, the 4th-order, 6th-order, 8th-order, and 10th-order aspheric surface coefficients A, B, C, and D of the aspheric surfaces in Numerical Example 4.

TABLE 12

| si | K | A | B | C | D |
|---|---|---|---|---|---|
| 6 | 1.87205E−02 | 1.55504E−03 | −7.29196E−05 | 1.28058E−06 | −8.31451E−09 |
| 7 | 0.00000E+00 | 1.30772E−03 | 2.86290E−05 | 2.31795E−06 | −2.93456E−07 |
| 10 | 1.73116E+00 | −1.97692E−03 | 9.62052E−05 | −4.82959E−06 | 0.00000E+00 |
| 11 | 0.00000E+00 | −1.27685E−03 | 7.61710E−05 | −4.13526E−06 | 6.38951E−08 |
| 13 | 0.00000E+00 | −5.18358E−04 | −2.58894E−06 | −4.16072E−07 | 0.00000E+00 |
| 18 | 0.00000E+00 | −1.82970E−05 | 4.13564E−06 | −1.76244E−07 | 3.16433E−09 |

Figure 13:
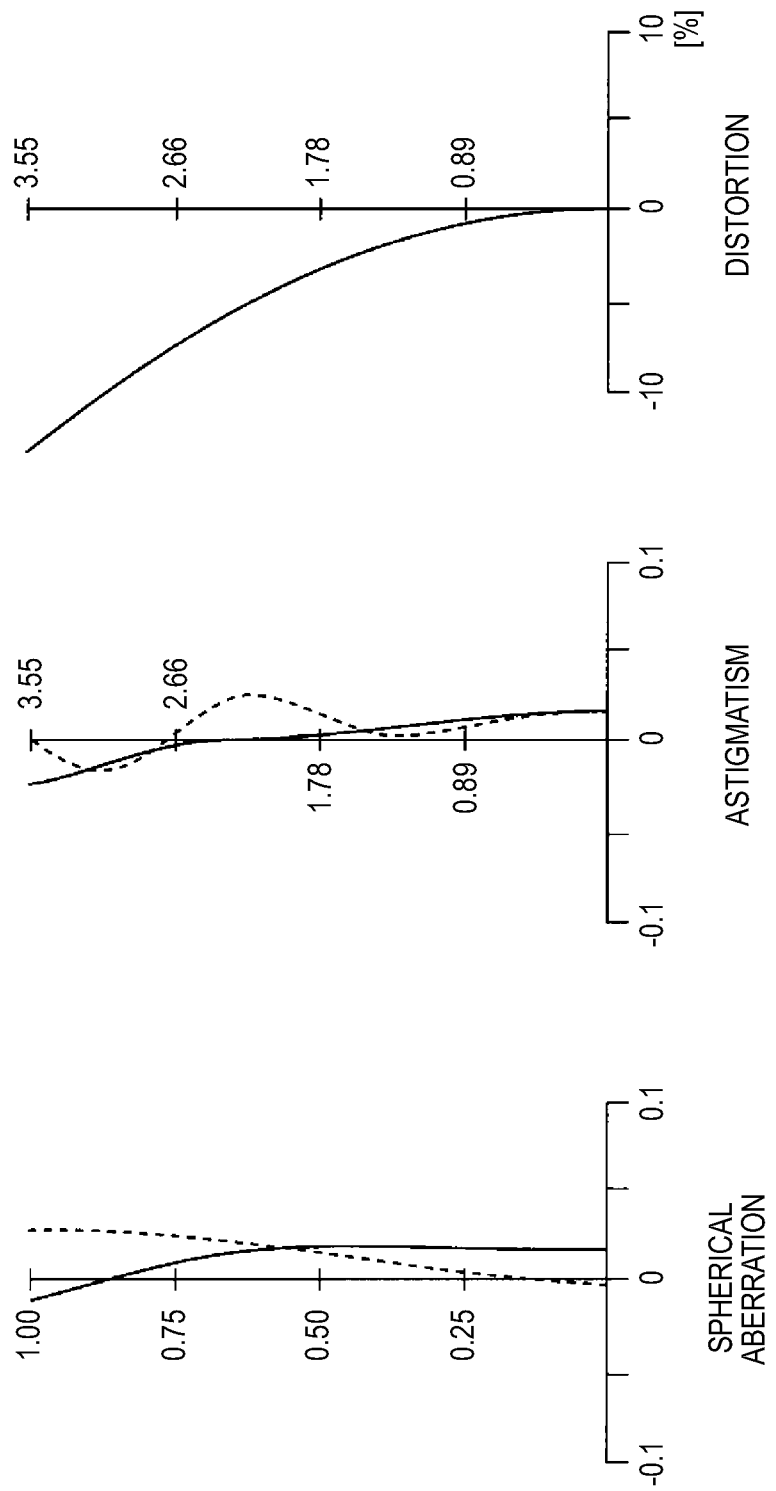
FIG. 13 shows, similarly to FIG. 14, an aberration diagram of a numerical example in which specific numerical values are applied to the fourth embodiment, and the drawing is a diagram illustrating spherical aberration, astigmatism, and distortion in the wide-angle end state.
Figure 14:
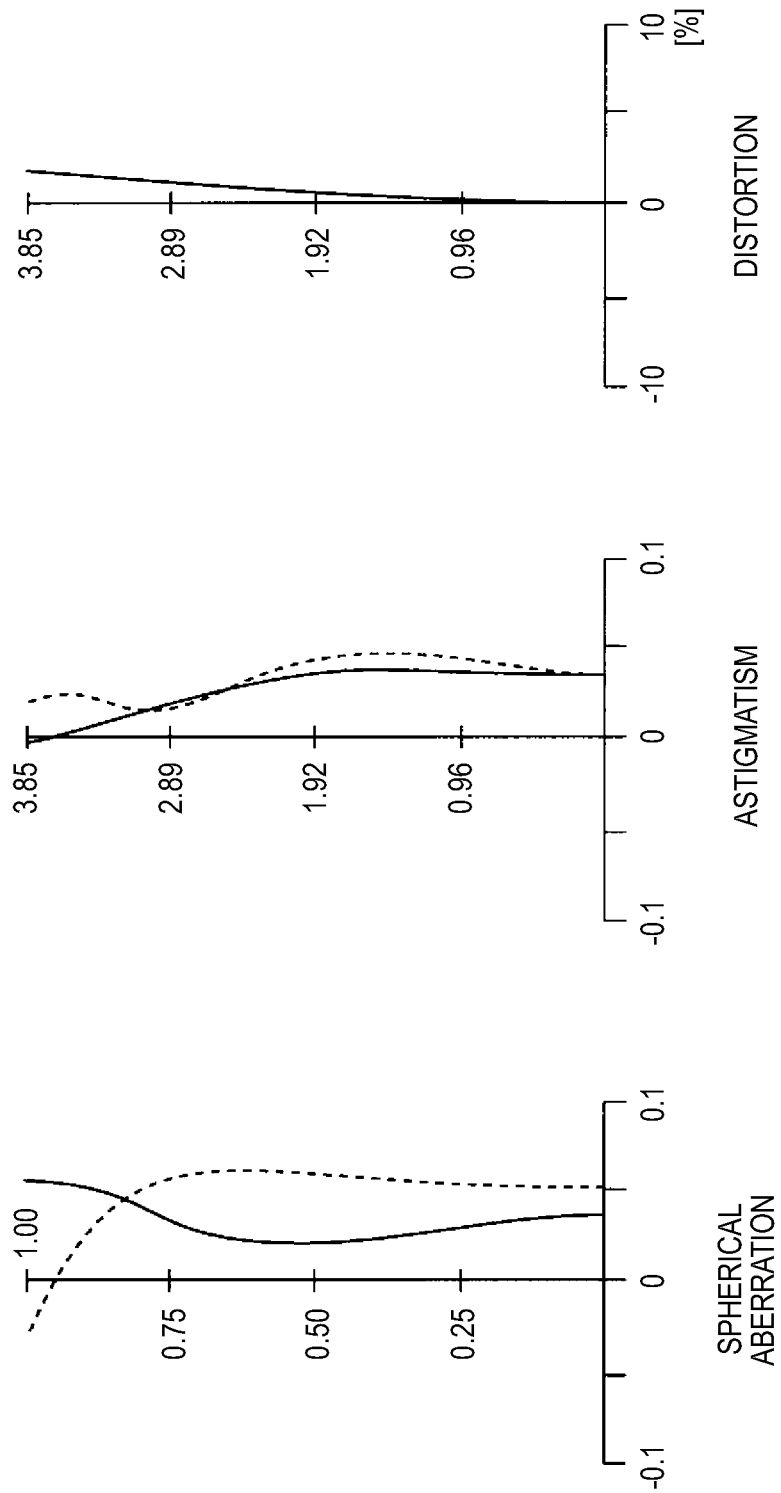
FIG. 14 is a diagram illustrating spherical aberration, astigmatism, and distortion in the telephoto end state.

FIGS. 13 and 14 show diagrams of various aberrations in a state where the focus is at infinity in Numerical Example 4, where FIG. 13 shows a diagram of various aberrations at the wide-angle end state and FIG. 14 shows a diagram of various aberrations at the telephoto end state.

In each spherical aberration diagram of FIGS. 13 and 14, the solid line represents the d-line (the wavelength of 587.6 nm), and the dashed line represents the g-line (the wavelength of 435.8 nm). In each astigmatism diagram, the solid line represents a value on the sagittal image plane, and the dotted line shows a value on the meridional image plane.

As can be clearly seen from the aberration diagrams, in Numerical Example 4, it is possible to obtain an excellent imaging performance by satisfactorily correcting various aberrations.

Fifth Embodiment

Figure 15:
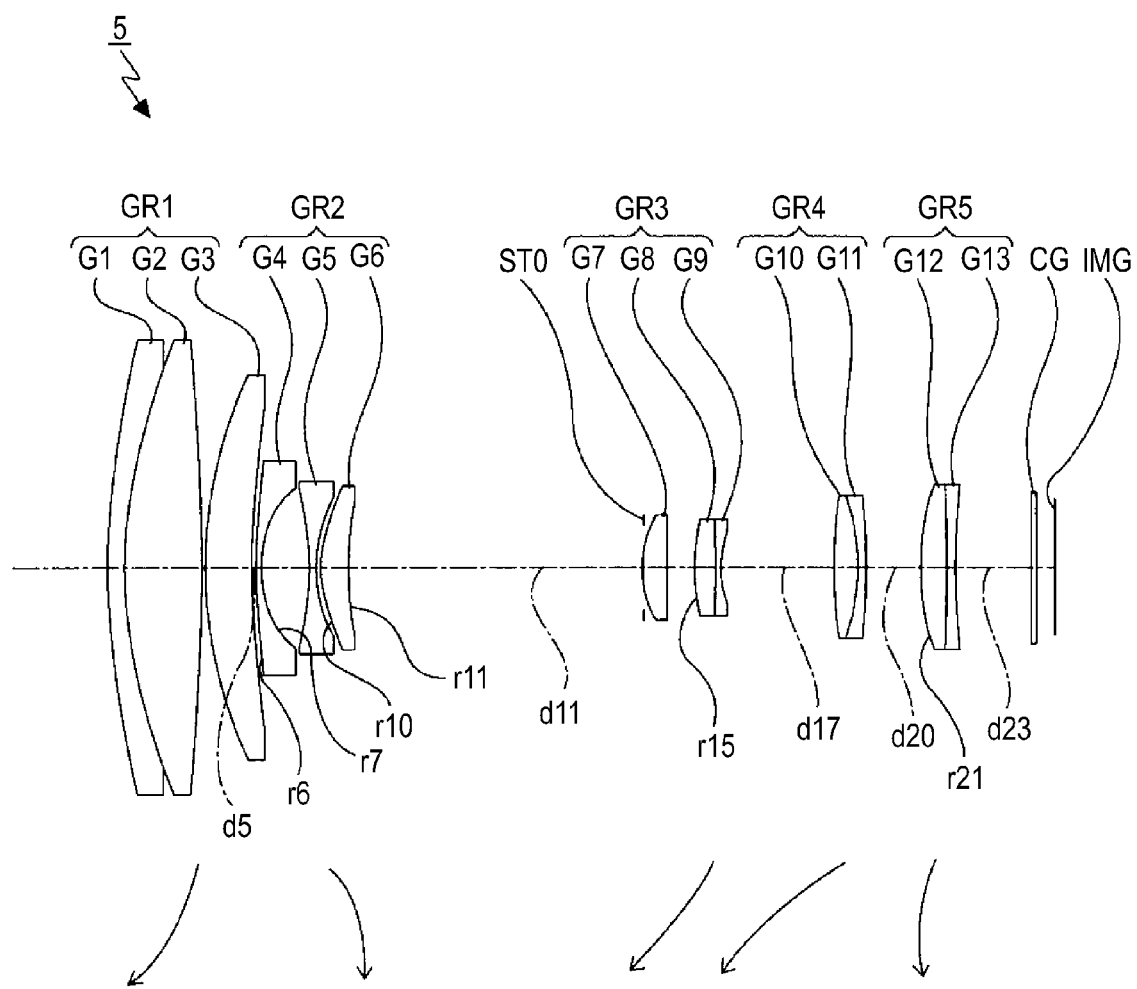
FIG. 15 is a diagram illustrating a lens configuration of a zoom lens according to a fifth embodiment.

FIG. 15 shows a lens configuration of a zoom lens 5 according to the fifth embodiment of the present technology.

The zoom lens 5 includes, in order from the object side to the image side: a first lens group GR1 with a positive refractive power; a second lens group GR2 with a negative refractive power; a third lens group GR3 with a positive refractive power; a fourth lens group GR4 with a positive refractive power; and a fifth lens group GR5 with a positive refractive power.

The zoom lens 5 has a zoom ratio of 17.9 magnifications.

The first lens group GR1 includes, in order from the object side to the image side: a cemented lens that is formed by cementing a negative lens G1, which is convex toward the object side and has a meniscus shape, and a positive lens G2 which has a biconvex shape; and a positive lens G3 that is convex toward the object side and has a meniscus shape.

The second lens group GR2 includes, in order from the object side to the image side: a first negative lens G4 that is convex toward the object side and has a meniscus shape; a second negative lens G5 that has a biconcave shape; and a positive lens G6 that is convex toward the object side and has a meniscus shape.

Although not shown in the drawing, the second lens group GR2 is configured such that the outer peripheral portion of the image side surface of the second negative lens G5 is in contact with the outer peripheral portion of the object side surface of the positive lens G6.

The outer peripheral portion of the object side surface of the positive lens G6 is formed as a flat surface perpendicular to the optical axis, and the flat surface is in contact with the outer peripheral portion of the image side surface of the second negative lens G5.

The third lens group GR3 includes, in order from the object side to the image side: a positive lens G7 that has a biconvex shape; and a cemented lens that is formed by cementing a positive lens G8, which is positioned on the object side and has a biconvex shape, and a negative lens G9 which is positioned on the image side and has a biconcave shape.

The fourth lens group GR4 includes a cemented lens that is formed by cementing a positive lens G10, which is positioned on the object side and has a biconvex shape, and a negative lens G11 which is positioned on the image side, is concave toward the object side, and has a meniscus shape.

The fifth lens group GR5 includes a cemented lens that is formed by cementing a positive lens G12, which is positioned on the object side and has a biconvex shape, and a negative lens G13 which is positioned on the image side and has a biconcave shape.

A cover glass CG is disposed between the fifth lens group GR5 and an image plane IMG. In addition, various filters such as an infrared cut filter may be disposed between the image plane IMG and the cover glass CG, and the cover glass CG may be configured to have same functions of the infrared cut filter and the like.

An aperture stop STO is disposed near the object side of the third lens group GR3, and is shifted integrally with the third lens group.

Table 13 shows the lens data of Numerical Example 5 of the zoom lens 5, to which specific numerical values are applied, according to the fifth embodiment.

TABLE 13

| si | ri | di | ni | vi |
|---|---|---|---|---|
| 1 | 57.839 | 1.000 | 1.84666 | 23.780 |
| 2 | 33.060 | 4.630 | 1.49700 | 81.608 |
| 3 | −142.539 | 0.150 | | |
| 4 | 27.031 | 2.720 | 1.72916 | 54.674 |
| 5 | 60.770 | (d5) | | |
| 6 (ASP) | 80.266 | 0.300 | 1.82080 | 42.706 |
| 7 (ASP) | 6.525 | 2.824 | | |
| 8 | −20.632 | 0.450 | 1.75500 | 52.321 |
| 9 | 9.135 | 0.250 | | |
| 10 (ASP) | 7.116 | 1.740 | 2.00170 | 19.324 |
| 11 (ASP) | 16.800 | (d11) | | |
| STO | INFINITY | 0.000 | | |
| 13 | 6.302 | 1.467 | 1.49700 | 81.608 |
| 14 | −106.451 | 1.650 | | |

TABLE 13-continued

| si | ri | di | ni | vi |
|---|---|---|---|---|
| 15 (ASP) | 11.208 | 1.200 | 1.74330 | 49.326 |
| 16 | −40.604 | 0.400 | 1.80610 | 33.269 |
| 17 | 7.642 | (d17) | | |
| 18 | 25.797 | 1.433 | 1.72000 | 43.690 |
| 19 | −13.800 | 0.350 | 1.84666 | 23.778 |
| 20 | −39.659 | (d20) | | |
| 21 (ASP) | 14.660 | 1.595 | 1.69350 | 53.201 |
| 22 | −63.308 | 0.400 | 1.74950 | 35.041 |
| 23 | 40.000 | (d23) | | |
| 24 | INFINITY | 0.300 | 1.51680 | 64.200 |
| 25 | INFINITY | 1.000 | | |
| IMG | INFINITY | | | |

In the zoom lens 5, during the power variation between the wide-angle end state and the telephoto end state, changes occur in an on-axis surface space d5 between the first lens group GR1 and the second lens group GR2, the on-axis surface space d11 between the second lens group GR2 and the third lens group GR3, an on-axis surface space d17 between the third lens group GR3 and the fourth lens group GR4, an on-axis surface space d20 between the fourth lens group GR4 and the fifth lens group GR5, and an on-axis surface space d23 between the fifth lens group GR5 and the cover glass CG.

Table 14 shows, together with the F number Fno and the half viewing angle ω, variable spaces at the wide-angle end state, the middle focal length state, and the telephoto end state in Numerical Example 5.

TABLE 14

| f | 4.78 | 15.91 | 85.60 |
|---|---|---|---|
| Fno | 3.24 | 4.17 | 5.77 |
| ω | 40.64 | 13.51 | 2.56 |
| d5 | 0.350 | 13.712 | 27.775 |
| d11 | 17.650 | 6.952 | 0.450 |
| d17 | 6.800 | 3.048 | 0.700 |
| d20 | 3.391 | 10.626 | 23.196 |
| d23 | 4.720 | 7.745 | 5.016 |

In the zoom lens 5, both surfaces (sixth surface and seventh surface) of the first negative lens G4 of the second lens group GR2, both surfaces (tenth surface and eleventh surface) of the positive lens G6, the object side surface (fifteenth surface) of the positive lens G8 of the third lens group GR3, and the object side surface (twenty-first surface) of the positive lens G12 of the fifth lens group GR5 are formed as aspheric surfaces. Table 15 shows, together with the conic constant K, the 4th-order, 6th-order, 8th-order, and 10th-order aspheric surface coefficients A, B, C, and D of the aspheric surfaces in Numerical Example 5.

TABLE 15

| si | K | A | B | C | D |
|---|---|---|---|---|---|
| 6 | 0.00000E+00 | 3.39144E−04 | −4.75395E−06 | −9.09618E−08 | 1.45120E−09 |
| 7 | 0.00000E+00 | −1.80011E−04 | 1.40828E−05 | 1.43241E−07 | −1.38184E−08 |
| 10 | −2.33597E+00 | −6.75670E−04 | 2.81089E−05 | −5.23368E−07 | 0.00000E+00 |
| 11 | 0.00000E+00 | −9.62886E−04 | 2.52024E−05 | −8.81277E−07 | 9.10039E−09 |
| 15 | 0.00000E+00 | −6.18040E−04 | −8.14747E−06 | −1.03010E−06 | 0.00000E+00 |
| 21 | 0.00000E+00 | −4.40212E−05 | 3.15897E−06 | −1.19731E−07 | 2.15770E−09 |

Figure 16:
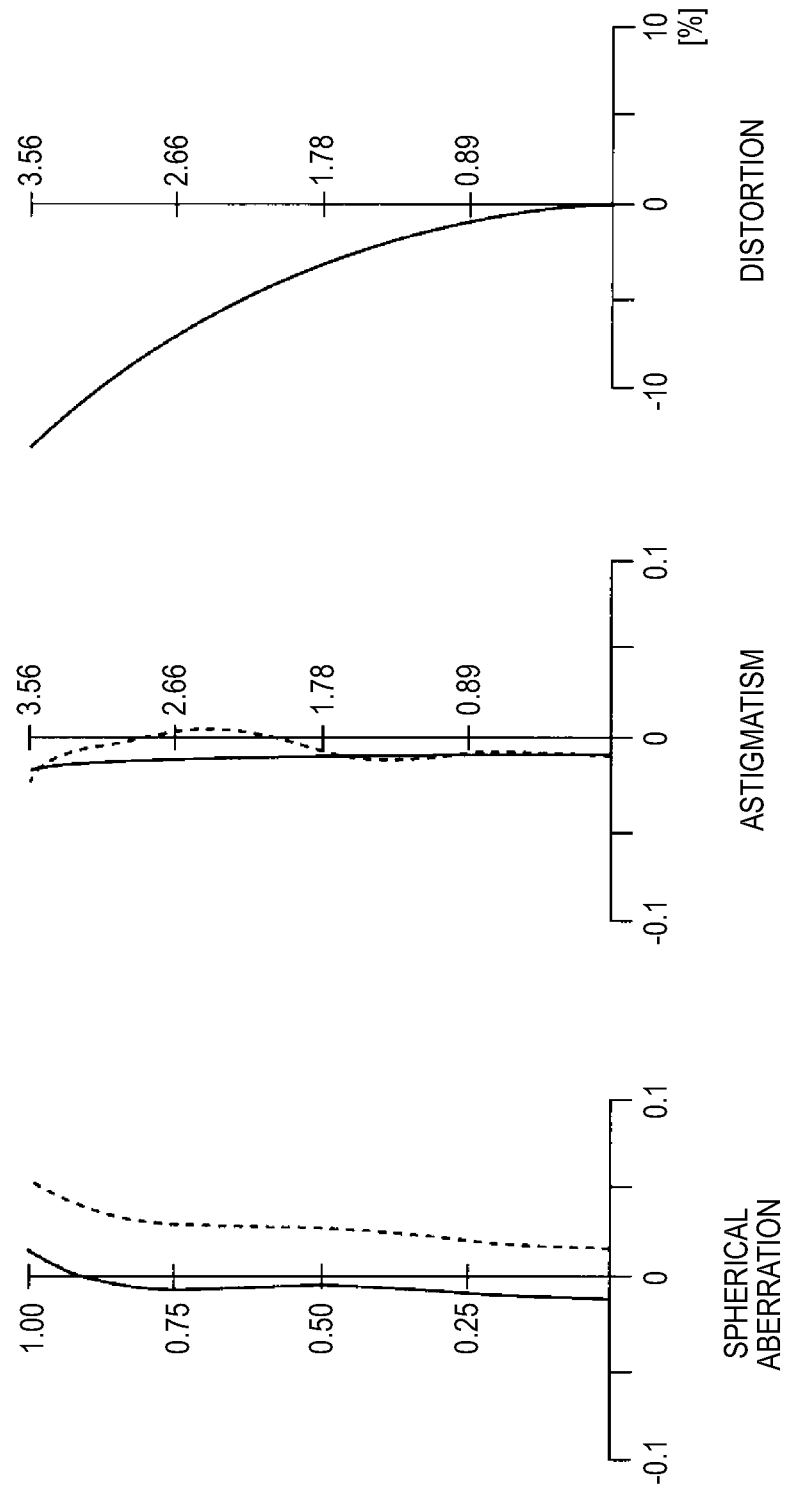
FIG. 16 shows, similarly to FIG. 17, an aberration diagram of a numerical example in which specific numerical values are applied to the fifth embodiment, and the drawing is a diagram illustrating spherical aberration, astigmatism, and distortion in the wide-angle end state.
Figure 17:
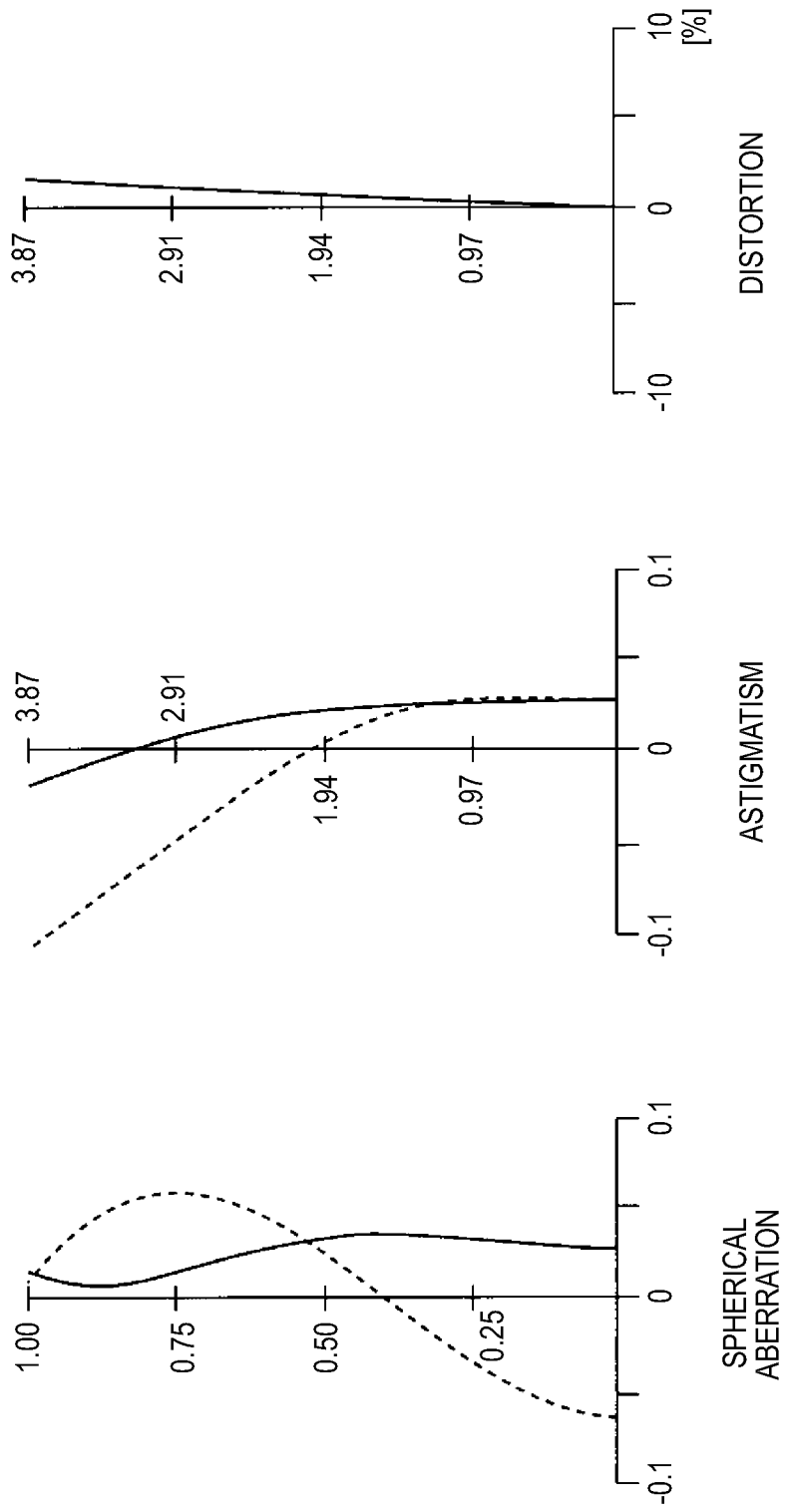
FIG. 17 is a diagram illustrating spherical aberration, astigmatism, and distortion in the telephoto end state.

FIGS. 16 and 17 show diagrams of various aberrations in a state where the focus is at infinity in Numerical Example 5, where FIG. 16 shows a diagram of various aberrations at the wide-angle end state and FIG. 17 shows a diagram of various aberrations at the telephoto end state.

In each spherical aberration diagram of FIGS. 16 and 17, the solid line represents the d-line (the wavelength of 587.6 nm), and the dashed line represents the g-line (the wavelength of 435.8 nm). In each astigmatism diagram, the solid line represents a value on the sagittal image plane, and the dotted line shows a value on the meridional image plane.

As can be clearly seen from the aberration diagrams, in Numerical Example 5, it is possible to obtain an excellent imaging performance by satisfactorily correcting various aberrations.

Sixth Embodiment

Figure 18:
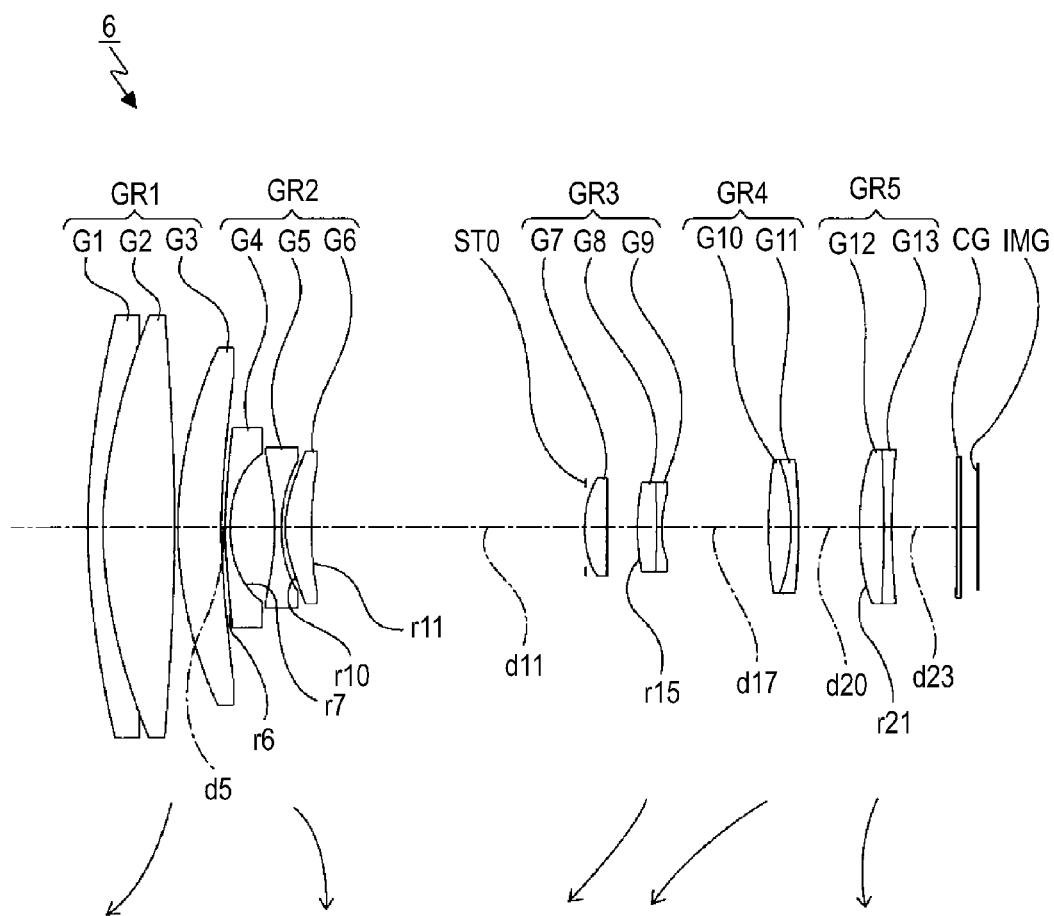
FIG. 18 is a diagram illustrating a lens configuration of a zoom lens according to a sixth embodiment.

FIG. 18 shows a lens configuration of a zoom lens 6 according to the sixth embodiment of the present technology.

The zoom lens 6 includes, in order from the object side to the image side: a first lens group GR1 with a positive refractive power; a second lens group GR2 with a negative refractive power; a third lens group GR3 with a positive refractive power; a fourth lens group GR4 with a positive refractive power; and a fifth lens group GR5 with a positive refractive power.

The zoom lens 6 has a zoom ratio of 17.9 magnifications.

The first lens group GR1 includes, in order from the object side to the image side: a cemented lens that is formed by cementing a negative lens G1, which is convex toward the object side and has a meniscus shape, and a positive lens G2 which has a biconvex shape; and a positive lens G3 that is convex toward the object side and has a meniscus shape.

The second lens group GR2 includes, in order from the object side to the image side: a first negative lens G4 that is convex toward the object side and has a meniscus shape; a second negative lens G5 that has a biconcave shape; and a positive lens G6 that is convex toward the object side and has a meniscus shape.

Although not shown in the drawing, the second lens group GR2 is configured such that the outer peripheral portion of the image side surface of the second negative lens G5 is in contact with the outer peripheral portion of the object side surface of the positive lens G6.

The outer peripheral portion of the object side surface of the positive lens G6 is formed as a flat surface perpendicular to the optical axis, and the flat surface is in contact with the outer peripheral portion of the image side surface of the second negative lens G5.

The third lens group GR3 includes, in order from the object side to the image side: a positive lens G7 that has a biconvex shape; and a cemented lens that is formed by cementing a positive lens G8, which is positioned on the object side and has a biconvex shape, and a negative lens G9 which is positioned on the image side and has a biconcave shape.

The fourth lens group GR4 includes a cemented lens that is formed by cementing a positive lens G10, which is positioned on the object side and has a biconvex shape, and a negative lens G11 which is positioned on the image side, is concave toward the object side, and has a meniscus shape.

The fifth lens group GR5 includes a cemented lens that is formed by cementing a positive lens G12, which is positioned on the object side and has a biconvex shape, and a negative lens G13 which is positioned on the image side and has a biconcave shape.

A cover glass CG is disposed between the fifth lens group GR5 and an image plane IMG. In addition, various filters such as an infrared cut filter may be disposed between the image plane IMG and the cover glass CG, and the cover glass CG may be configured to have same functions of the infrared cut filter and the like.

An aperture stop STO is disposed near the object side of the third lens group GR3, and is shifted integrally with the third lens group.

Table 16 shows the lens data of Numerical Example 6 of the zoom lens 6, to which specific numerical values are applied, according to the sixth embodiment.

TABLE 16

| si | ri | di | ni | vi |
|---|---|---|---|---|
| 1 | 55.361 | 0.900 | 1.84666 | 23.780 |
| 2 | 31.874 | 4.620 | 1.49700 | 81.608 |
| 3 | −153.898 | 0.150 | | |
| 4 | 26.765 | 2.785 | 1.72916 | 54.674 |
| 5 | 63.037 | (d5) | | |
| 6 (ASP) | 128.554 | 0.300 | 1.80139 | 45.450 |
| 7 (ASP) | 6.490 | 2.916 | | |
| 8 | −17.500 | 0.450 | 1.75500 | 52.323 |
| 9 | 9.096 | 0.250 | | |
| 10 (ASP) | 7.000 | 1.841 | 1.92286 | 20.880 |
| 11 (ASP) | 21.077 | (d11) | | |
| STO | INFINITY | 0.000 | | |
| 13 | 6.398 | 1.461 | 1.49700 | 81.608 |
| 14 | −62.405 | 1.650 | | |
| 15 (ASP) | 12.951 | 1.200 | 1.76802 | 49.241 |
| 16 | −42.137 | 0.400 | 1.80610 | 33.269 |
| 17 | 8.000 | (d17) | | |
| 18 | 24.656 | 1.350 | 1.61800 | 63.390 |
| 19 | −16.655 | 0.350 | 1.68893 | 31.161 |
| 20 | −41.958 | (d20) | | |
| 21 (ASP) | 14.660 | 1.627 | 1.74330 | 49.326 |
| 22 | −160.000 | 0.400 | 1.84666 | 23.780 |
| 23 | 42.012 | (d23) | | |
| 24 | INFINITY | 0.300 | 1.51680 | 64.200 |
| 25 | INFINITY | 1.000 | | |
| IMG | INFINITY | | | |

In the zoom lens 6, during the power variation between the wide-angle end state and the telephoto end state, changes occur in an on-axis surface space d5 between the first lens group GR1 and the second lens group GR2, the on-axis surface space d11 between the second lens group GR2 and the third lens group GR3, an on-axis surface space d17 between the third lens group GR3 and the fourth lens group GR4, an on-axis surface space d20 between the fourth lens group GR4 and the fifth lens group GR5, and an on-axis surface space d23 between the fifth lens group GR5 and the cover glass CG.

Table 17 shows, together with the F number Fno and the half viewing angle ω, variable spaces at the wide-angle end state, the middle focal length state, and the telephoto end state in Numerical Example 6.

TABLE 17

| f | 4.78 | 16.01 | 85.60 |
|---|---|---|---|
| Fno | 3.30 | 4.17 | 5.74 |
| ω | 40.55 | 13.41 | 2.56 |
| d5 | 0.350 | 13.533 | 26.958 |
| d11 | 18.230 | 7.030 | 0.450 |
| d17 | 7.200 | 3.085 | 0.700 |
| d20 | 4.208 | 11.315 | 23.895 |
| d23 | 4.184 | 7.750 | 4.997 |

In the zoom lens 6, both surfaces (sixth surface and seventh surface) of the first negative lens G4 of the second lens group GR2, both surfaces (tenth surface and eleventh surface) of the positive lens G6, the object side surface (fifteenth surface) of the positive lens G8 of the third lens group GR3, and the object side surface (twenty-first surface) of the positive lens G12 of the fifth lens group GR5 are formed as aspheric surfaces. Table 18 shows, together with the conic constant K, the 4th-order, 6th-order, 8th-order, and 10th-order aspheric surface coefficients A, B, C, and D of the aspheric surfaces in Numerical Example 6.

TABLE 18

| si | K | A | B | C | D |
|----|---|---|---|---|---|
| 6 | 0.00000E+00 | 2.94783E−04 | −9.60130E−08 | −1.47436E−07 | 1.56181E−09 |
| 7 | 0.00000E+00 | −2.68801E−04 | 1.71359E−05 | 1.13507E−07 | −7.16649E−09 |
| 10 | −2.57276E+00 | −4.27160E−04 | 2.41367E−05 | −6.28570E−07 | 0.00000E+00 |
| 11 | 0.00000E+00 | −7.03057E−04 | 2.24884E−05 | −1.06302E−06 | 1.13224E−08 |
| 15 | 0.00000E+00 | −5.94875E−04 | −9.46913E−06 | −7.72064E−07 | 0.00000E+00 |
| 21 | 0.00000E+00 | −3.19776E−05 | 1.58179E−06 | −3.70953E−08 | 4.94926E−10 |

Figure 19:
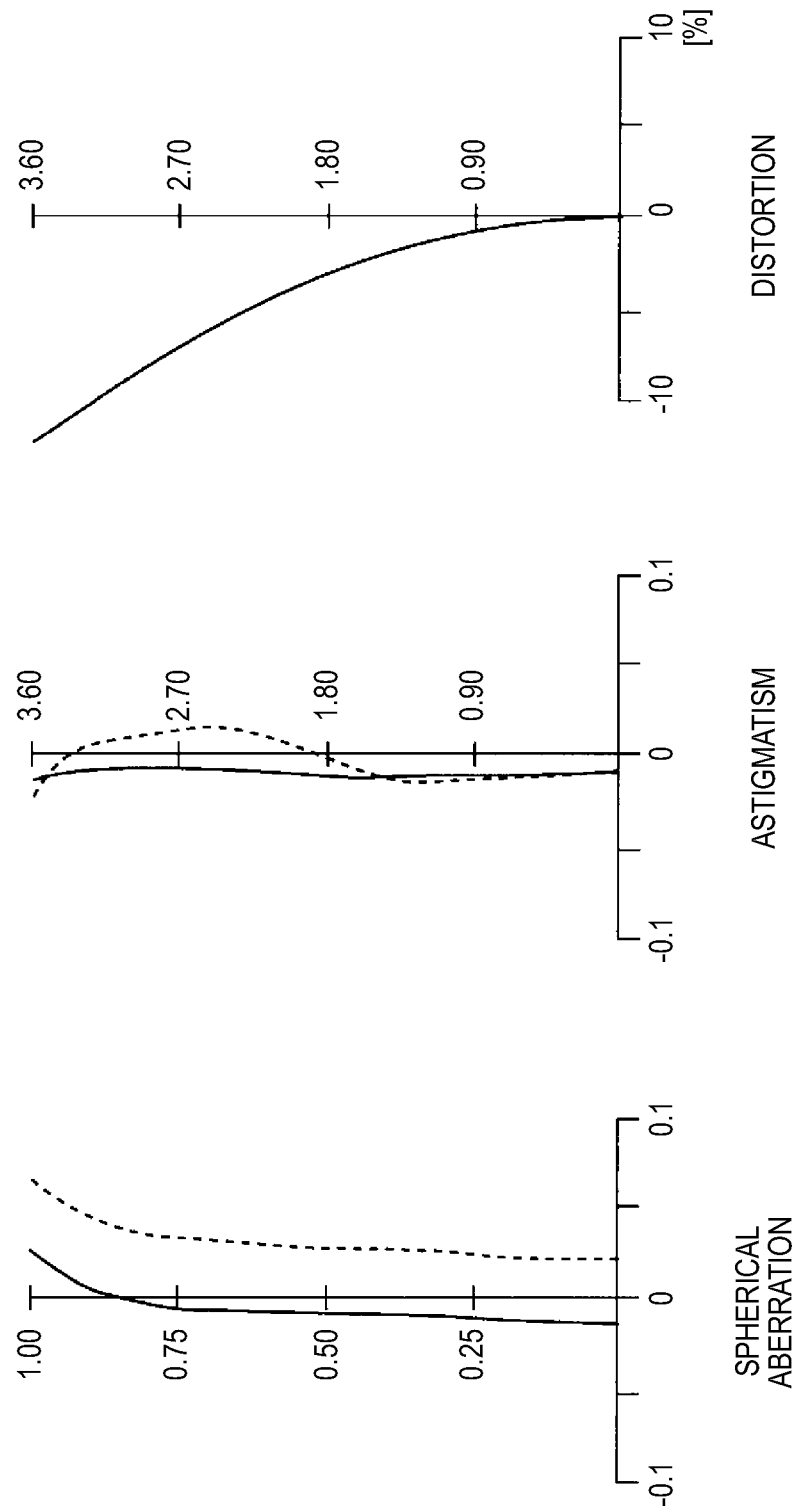
FIG. 19 shows, similarly to FIG. 20, an aberration diagram of a numerical example in which specific numerical values are applied to the sixth embodiment, and the drawing is a diagram illustrating spherical aberration, astigmatism, and distortion in the wide-angle end state.
Figure 20:
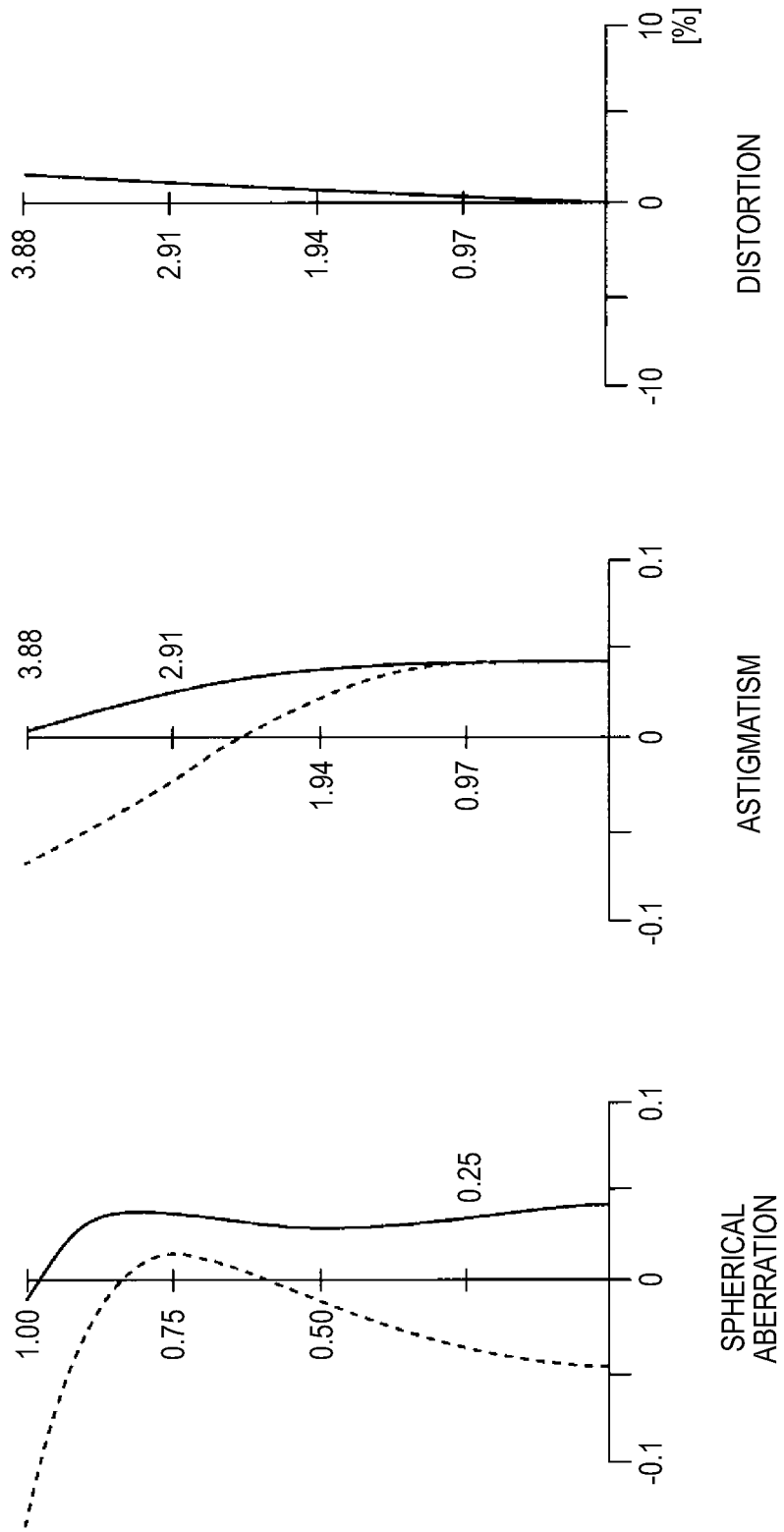
FIG. 20 is a diagram illustrating spherical aberration, astigmatism, and distortion in the telephoto end state.

FIGS. 19 and 20 show diagrams of various aberrations in a state where the focus is at infinity in Numerical Example 6, where FIG. 19 shows a diagram of various aberrations at the wide-angle end state and FIG. 20 shows a diagram of various aberrations at the telephoto end state.

In each spherical aberration diagram of FIGS. 19 and 20, the solid line represents the d-line (the wavelength of 587.6 nm), and the dashed line represents the g-line (the wavelength of 435.8 nm). In each astigmatism diagram, the solid line represents a value on the sagittal image plane, and the dotted line shows a value on the meridional image plane.

As can be clearly seen from the aberration diagrams, in Numerical Example 6, it is possible to obtain an excellent imaging performance by satisfactorily correcting various aberrations.

Seventh Embodiment

Figure 21:
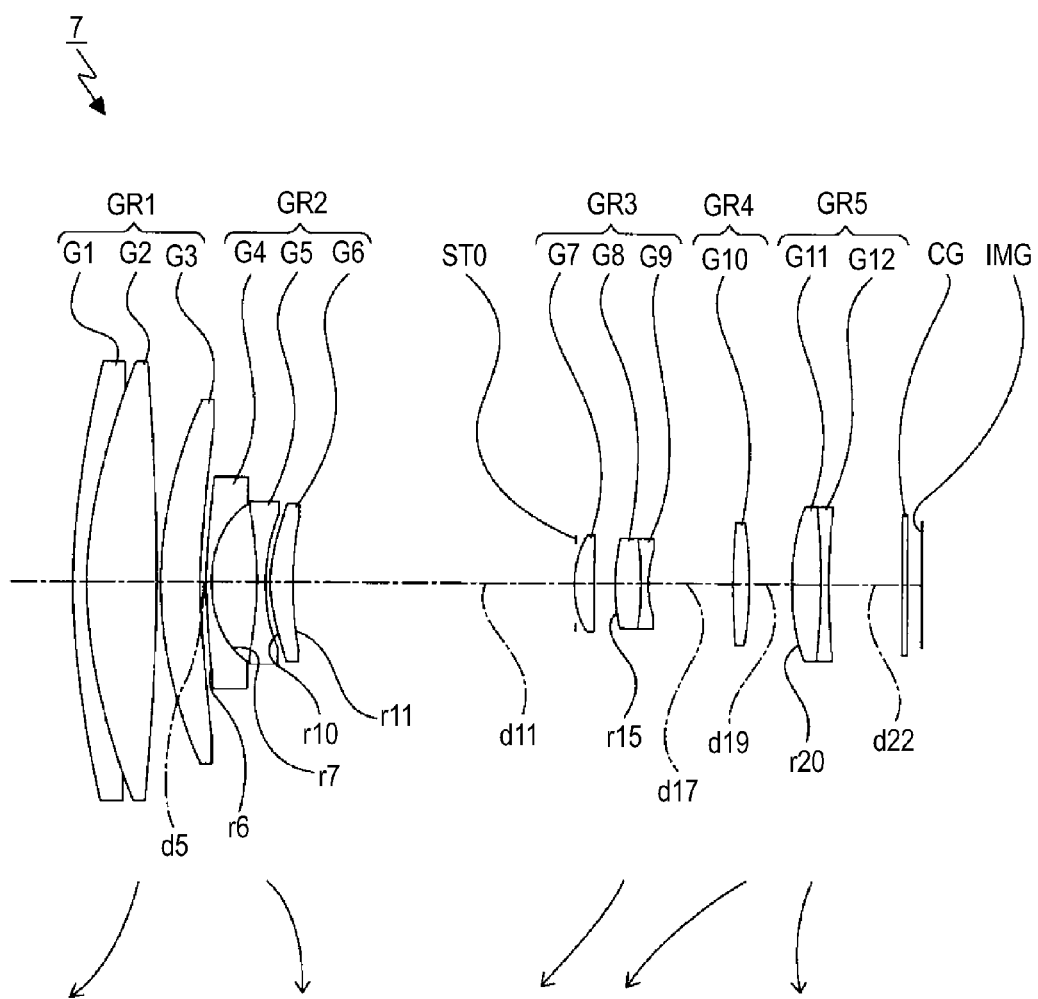
FIG. 21 is a diagram illustrating a lens configuration of a zoom lens according to a seventh embodiment.

FIG. 21 shows a lens configuration of a zoom lens 7 according to the seventh embodiment of the present technology.

The zoom lens 7 includes, in order from the object side to the image side: a first lens group GR1 with a positive refractive power; a second lens group GR2 with a negative refractive power; a third lens group GR3 with a positive refractive power; a fourth lens group GR4 with a positive refractive power; and a fifth lens group GR5 with a positive refractive power.

The zoom lens 7 has a zoom ratio of 17.8 magnifications.

The first lens group GR1 includes, in order from the object side to the image side: a cemented lens that is formed by cementing a negative lens G1, which is convex toward the object side and has a meniscus shape, and a positive lens G2 which has a biconvex shape; and a positive lens G3 that is convex toward the object side and has a meniscus shape.

The second lens group GR2 includes, in order from the object side to the image side: a first negative lens G4 that is convex toward the object side and has a meniscus shape; a second negative lens G5 that has a biconcave shape; and a positive lens G6 that is convex toward the object side and has a meniscus shape.

Although not shown in the drawing, the second lens group GR2 is configured such that the outer peripheral portion of the image side surface of the second negative lens G5 is in contact with the outer peripheral portion of the object side surface of the positive lens G6.

The outer peripheral portion of the object side surface of the positive lens G6 is formed as a flat surface perpendicular to the optical axis, and the flat surface is in contact with the outer peripheral portion of the image side surface of the second negative lens G5.

The third lens group GR3 includes, in order from the object side to the image side: a positive lens G7 that has a biconvex shape; and a cemented lens that is formed by cementing a positive lens G8, which is positioned on the object side and has a biconvex shape, and a negative lens G9 which is positioned on the image side and has a biconcave shape.

The fourth lens group GR4 includes a positive lens G10 that is positioned on the object side and has a biconvex shape.

The fifth lens group GR5 includes a cemented lens that is formed by cementing a positive lens G11, which is positioned on the object side and has a biconvex shape, and a negative lens G12 which is positioned on the image side and has a biconcave shape.

A cover glass CG is disposed between the fifth lens group GR5 and an image plane IMG. In addition, various filters such as an infrared cut filter may be disposed between the image plane IMG and the cover glass CG, and the cover glass CG may be configured to have same functions of the infrared cut filter and the like.

An aperture stop STO is disposed near the object side of the third lens group GR3, and is shifted integrally with the third lens group.

Table 19 shows the lens data of Numerical Example 7 of the zoom lens 7, to which specific numerical values are applied, according to the seventh embodiment.

TABLE 19

| si | ri | di | ni | vi |
|----|----|----|----|----|
| 1 | 56.343 | 0.900 | 1.84666 | 23.780 |
| 2 | 32.650 | 4.669 | 1.49700 | 81.608 |
| 3 | −128.654 | 0.150 | | |
| 4 | 25.788 | 2.678 | 1.72916 | 54.674 |
| 5 | 53.848 | (d5) | | |
| 6 (ASP) | 26.879 | 0.300 | 1.85135 | 40.105 |
| 7 (ASP) | 5.762 | 3.078 | | |
| 8 | −23.746 | 0.450 | 1.77250 | 49.624 |
| 9 | 11.240 | 0.250 | | |
| 10 (ASP) | 8.739 | 1.769 | 1.94595 | 17.980 |
| 11 (ASP) | 25.140 | (d11) | | |
| STO | INFINITY | 0.000 | | |
| 13 | 6.408 | 1.500 | 1.49700 | 81.608 |
| 14 | −52.628 | 1.200 | | |
| 15 (ASP) | 10.821 | 1.686 | 1.80139 | 45.450 |
| 16 | −15.160 | 0.450 | 1.80610 | 33.269 |
| 17 | 6.586 | (d17) | | |
| 18 | 34.203 | 1.000 | 1.49700 | 81.608 |
| 19 | −34.203 | (d19) | | |
| 20 (ASP) | 15.000 | 1.970 | 1.77377 | 47.167 |
| 21 | −29.992 | 0.449 | 1.80518 | 25.456 |
| 22 | 52.222 | (d22) | | |
| 23 | INFINITY | 0.300 | 1.51680 | 64.200 |
| 24 | INFINITY | 1.000 | | |
| IMG | INFINITY | | | |

In the zoom lens 7, during the power variation between the wide-angle end state and the telephoto end state, changes occur in an on-axis surface space d5 between the first lens group GR1 and the second lens group GR2, the on-axis surface space d11 between the second lens group GR2 and the third lens group GR3, an on-axis surface space d17 between the third lens group GR3 and the fourth lens group GR4, an on-axis surface space d19 between the fourth lens group GR4 and the fifth lens group GR5, and an on-axis surface space d22 between the fifth lens group GR5 and the cover glass CG.

Table 20 shows, together with the F number Fno and the half viewing angle ω, variable spaces at the wide-angle end state, the middle focal length state, and the telephoto end state in Numerical Example 7.

TABLE 20

| f | 4.80 | 17.70 | 85.53 |
|---|---|---|---|
| Fno | 3.29 | 4.20 | 5.94 |
| ω | 40.55 | 12.23 | 2.56 |
| d5 | 0.351 | 15.075 | 27.079 |
| d11 | 18.242 | 6.477 | 0.450 |
| d17 | 5.629 | 2.362 | 0.500 |
| d19 | 2.838 | 7.908 | 23.001 |
| d22 | 4.770 | 9.390 | 3.986 |

In the zoom lens 7, both surfaces (sixth surface and seventh surface) of the first negative lens G4 of the second lens group GR2, both surfaces (tenth surface and eleventh surface) of the positive lens G6, the object side surface (fifteenth surface) of the positive lens G8 of the third lens group GR3, and the object side surface (twentieth surface) of the positive lens G11 of the fifth lens group GR5 are formed as aspheric surfaces. Table 21 shows, together with the conic constant K, the 4th-order, 6th-order, 8th-order, and 10th-order aspheric surface coefficients A, B, C, and D of the aspheric surfaces in Numerical Example 7.

TABLE 21

| si | K | A | B | C | D |
|---|---|---|---|---|---|
| 6 | 0.00000E+00 | 1.96214E−05 | −8.15292E−06 | 7.73064E−08 | 8.80942E−11 |
| 7 | 0.00000E+00 | −9.27232E−05 | −5.60063E−06 | 4.95224E−08 | −3.05057E−08 |
| 10 | −2.64849E+00 | −1.64181E−04 | 1.85119E−05 | −7.79701E−07 | 0.00000E+00 |
| 11 | 0.00000E+00 | −5.14569E−04 | 2.00736E−05 | −1.00151E−06 | 7.73092E−09 |
| 15 | 0.00000E+00 | −5.16424E−04 | −1.04692E−05 | −4.58026E−07 | 0.00000E+00 |
| 20 | 0.00000E+00 | −1.68363E−05 | 1.38085E−06 | −1.98138E−08 | 2.19798E−11 |

Figure 22:
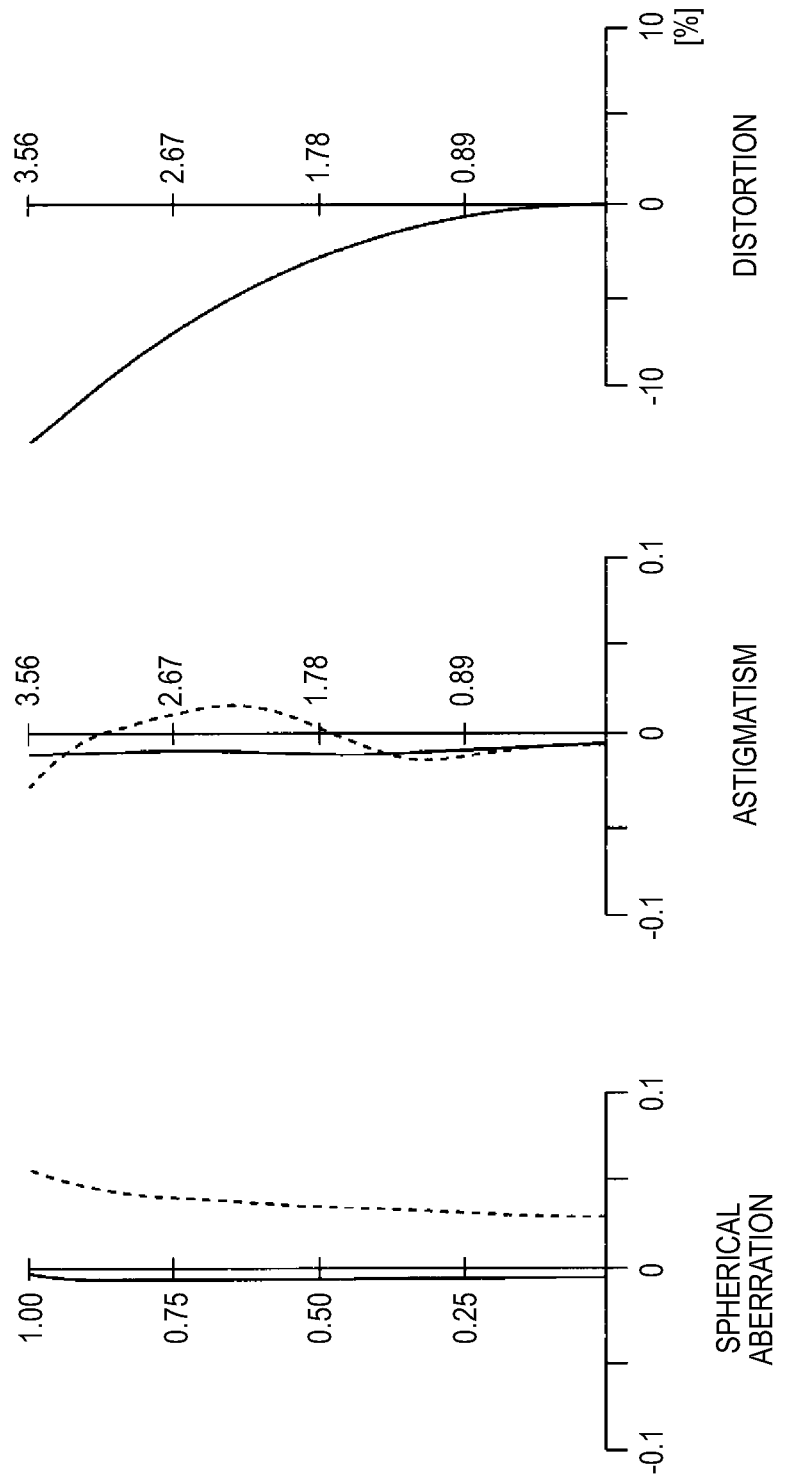
FIG. 22 shows, similarly to FIG. 23, an aberration diagram of a numerical example in which specific numerical values are applied to the seventh embodiment, and the drawing is a diagram illustrating spherical aberration, astigmatism, and distortion in the wide-angle end state.
Figure 23:
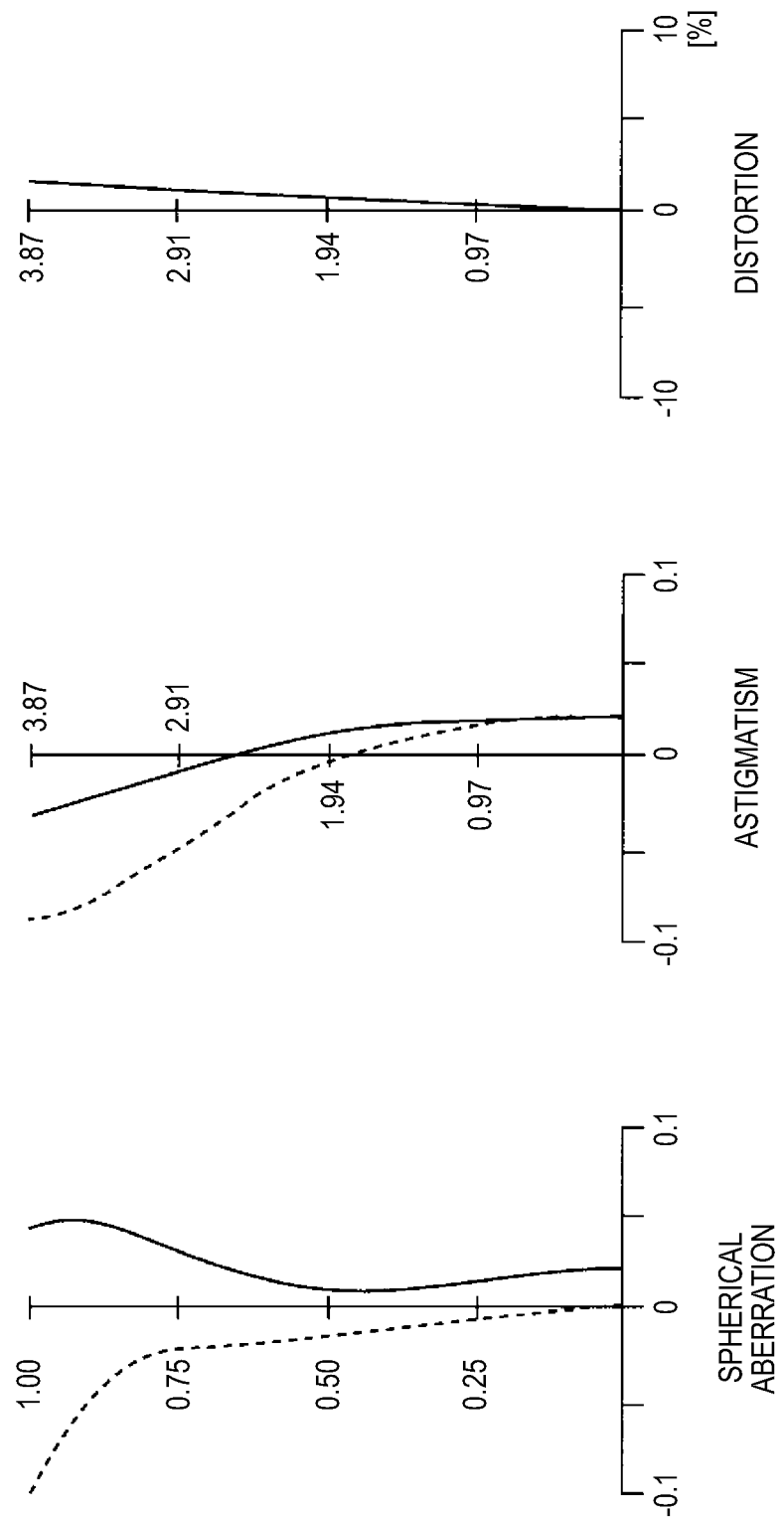
FIG. 23 is a diagram illustrating spherical aberration, astigmatism, and distortion in the telephoto end state.

FIGS. 22 and 23 show diagrams of various aberrations in a state where the focus is at infinity in Numerical Example 7, where FIG. 22 shows a diagram of various aberrations at the wide-angle end state and FIG. 23 shows a diagram of various aberrations at the telephoto end state.

In each spherical aberration diagram of FIGS. 22 and 23, the solid line represents the d-line (the wavelength of 587.6 nm), and the dashed line represents the g-line (the wavelength of 435.8 nm). In each astigmatism diagram, the solid line represents a value on the sagittal image plane, and the dotted line shows a value on the meridional image plane.

As can be clearly seen from the aberration diagrams, in Numerical Example 7, it is possible to obtain an excellent imaging performance by satisfactorily correcting various aberrations.

Eighth Embodiment

Figure 24:
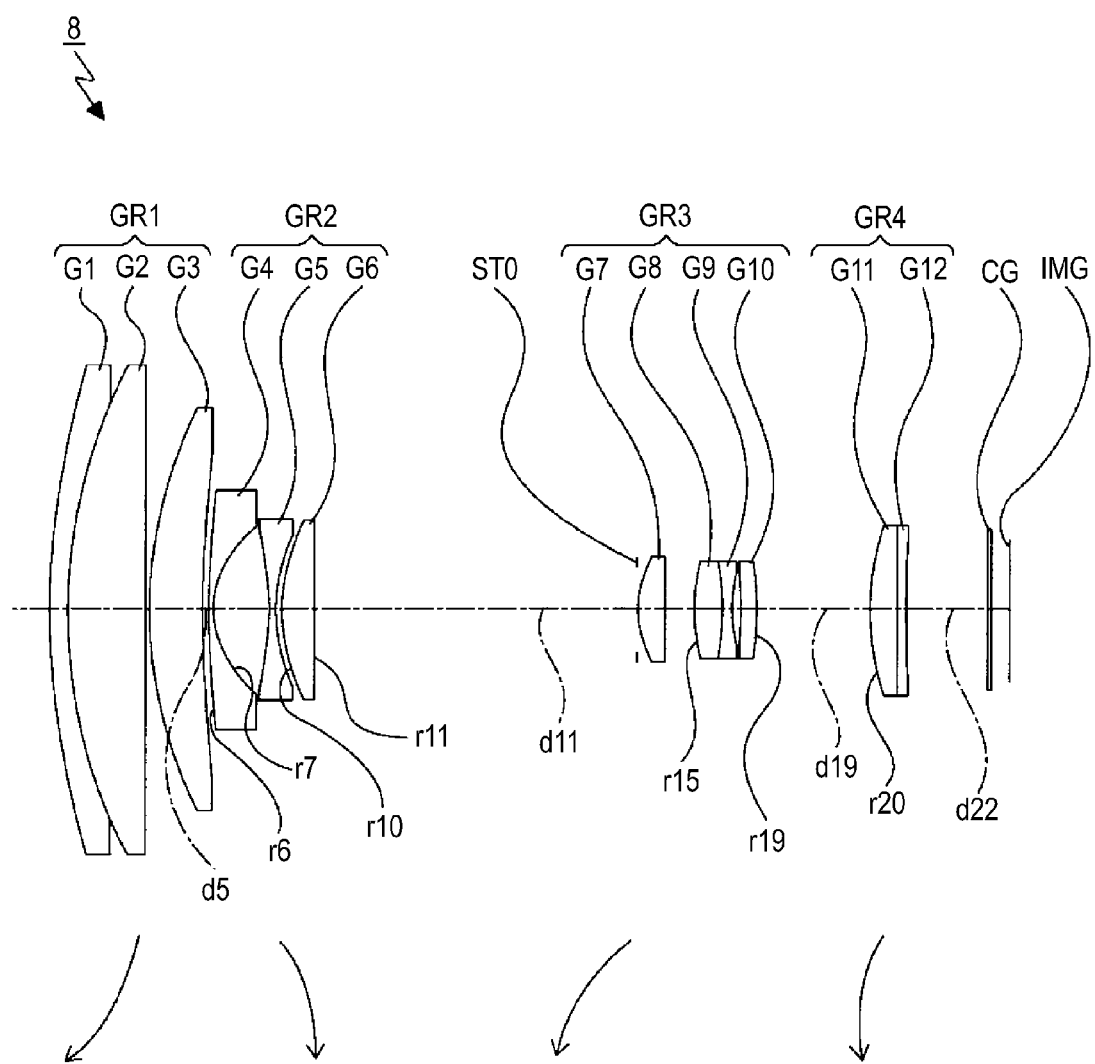
FIG. 24 is a diagram illustrating a lens configuration of a zoom lens according to an eighth embodiment.

FIG. 24 shows a lens configuration of a zoom lens 8 according to the eighth embodiment of the present technology.

The zoom lens 8 includes, in order from the object side to the image side: a first lens group GR1 with a positive refractive power; a second lens group GR2 with a negative refractive power; a third lens group GR3 with a positive refractive power; and a fourth lens group GR4 with a positive refractive power.

The zoom lens 8 has a zoom ratio of 17.8 magnifications.

The first lens group GR1 includes, in order from the object side to the image side: a cemented lens that is formed by cementing a negative lens G1, which is convex toward the object side and has a meniscus shape, and a positive lens G2 which has a biconvex shape; and a positive lens G3 that is convex toward the object side and has a meniscus shape.

The second lens group GR2 includes, in order from the object side to the image side: a first negative lens G4 that is convex toward the object side and has a meniscus shape; a second negative lens G5 that has a biconcave shape; and a positive lens G6 that is convex toward the object side and has a meniscus shape.

Although not shown in the drawing, the second lens group GR2 is configured such that the outer peripheral portion of the image side surface of the second negative lens G5 is in contact with the outer peripheral portion of the object side surface of the positive lens G6.

The outer peripheral portion of the object side surface of the positive lens G6 is formed as a flat surface perpendicular to the optical axis, and the flat surface is in contact with the outer peripheral portion of the image side surface of the second negative lens G5.

The third lens group GR3 includes, in order from the object side to the image side: a positive lens G7 that is convex toward the object side; a cemented lens that is formed by cementing a positive lens G8, which is positioned on the object side and has a biconvex shape, and a negative lens G9 which is positioned on the image side and has a biconcave shape; and a positive lens G10 that is convex toward the image side.

The fourth lens group GR4 includes a cemented lens that is formed by cementing a positive lens G11, which is positioned on the object side and has a biconvex shape, and a negative lens G12 which is positioned on the image side and has a biconcave shape.

A cover glass CG is disposed between the fourth lens group GR4 and an image plane IMG. In addition, various filters such as an infrared cut filter may be disposed between the image plane IMG and the cover glass CG, and the cover glass CG may be configured to have same functions of the infrared cut filter and the like.

An aperture stop STO is disposed near the object side of the third lens group GR3, and is shifted integrally with the third lens group.

Table 22 shows the lens data of Numerical Example 8 of the zoom lens 8, to which specific numerical values are applied, according to the eighth embodiment.

TABLE 22

| si | ri | di | ni | vi |
|---|---|---|---|---|
| 1 | 48.316 | 0.900 | 1.84666 | 23.780 |
| 2 | 28.839 | 4.548 | 1.49700 | 81.608 |
| 3 | −589.717 | 0.150 | | |
| 4 | 26.219 | 3.078 | 1.72916 | 54.674 |
| 5 | 78.875 | (d5) | | |
| 6 (ASP) | 240.717 | 0.300 | 1.82080 | 42.706 |
| 7 (ASP) | 6.259 | 3.049 | | |
| 8 | −18.546 | 0.450 | 1.75500 | 52.323 |
| 9 | 10.807 | 0.250 | | |
| 10 (ASP) | 8.161 | 1.863 | 1.92286 | 20.880 |
| 11 (ASP) | 32.888 | (d11) | | |
| STO | INFINITY | 0.000 | | |
| 13 | 6.044 | 1.602 | 1.49700 | 81.608 |
| 14 | 1247.358 | 1.654 | | |
| 15 (ASP) | 11.056 | 1.648 | 1.75501 | 51.158 |
| 16 | −12.969 | 0.450 | 1.80610 | 33.269 |
| 17 | 7.988 | 0.513 | | |
| 18 | −30.000 | 1.000 | 1.49710 | 81.560 |
| 19 (ASP) | −12.834 | (d19) | | |
| 20 (ASP) | 15.233 | 1.644 | 1.72903 | 54.041 |
| 21 | −200.000 | 0.400 | 1.90366 | 31.315 |
| 22 | 51.627 | (d22) | | |
| 23 | INFINITY | 0.300 | 1.51680 | 64.200 |

TABLE 22-continued

| si | ri | di | ni | vi |
|---|---|---|---|---|
| 24 | INFINITY | 1.000 | | |
| IMG | INFINITY | | | |

In the zoom lens 8, during the power variation between the wide-angle end state and the telephoto end state, changes occur in an on-axis surface space d5 between the first lens group GR1 and the second lens group GR2, the on-axis surface space d11 between the second lens group GR2 and the third lens group GR3, an on-axis surface space d19 between the third lens group GR3 and the fourth lens group GR4, and an on-axis surface space d22 between the fourth lens group GR4 and the cover glass CG.

Table 23 shows, together with the F number Fno and the half viewing angle ω, variable spaces at the wide-angle end state, the middle focal length state, and the telephoto end state in Numerical Example 8.

TABLE 23

| f | 4.80 | 21.25 | 85.49 |
|---|---|---|---|
| Fno | 3.41 | 4.69 | 5.89 |
| ω | 40.69 | 10.25 | 2.56 |
| d5 | 0.350 | 14.963 | 25.412 |
| d11 | 18.462 | 5.192 | 0.450 |
| d19 | 6.348 | 4.597 | 21.301 |
| d22 | 4.628 | 13.680 | 4.276 |

In the zoom lens 8, both surfaces (sixth surface and seventh surface) of the first negative lens G4 of the second lens group GR2, both surfaces (tenth surface and eleventh surface) of the positive lens G6, the object side surface (fifteenth surface) of the positive lens G8 of the third lens group GR3, the image side surface (nineteenth surface) of the positive lens G10 of the third lens group GR3, and the object side surface (twentieth surface) of the positive lens G11 of the fourth lens group GR4 are formed as aspheric surfaces. Table 24 shows, together with the conic constant K, the 4th-order, 6th-order, 8th-order, and 10th-order aspheric surface coefficients A, B, C, and D of the aspheric surfaces in Numerical Example 8.

TABLE 24

| si | K | A | B | C | D |
|---|---|---|---|---|---|
| 6 | 0.00000E+00 | 4.94611E−04 | −1.32866E−05 | 1.36679E−07 | −5.05058E−10 |
| 7 | 0.00000E+00 | 2.20409E−04 | 3.96332E−06 | 2.65125E−07 | −1.43295E−08 |
| 10 | −2.55737E+00 | −1.28612E−04 | 8.49045E−06 | −2.36611E−07 | 0.00000E+00 |
| 11 | 0.00000E+00 | −3.02933E−04 | 2.38943E−06 | −1.36738E−07 | −1.98531E−11 |
| 15 | 0.00000E+00 | −6.78911E−04 | −6.74477E−06 | −1.31726E−06 | 0.00000E+00 |
| 19 | 0.00000E+00 | −1.64076E−05 | 4.08668E−05 | −3.09774E−06 | 0.00000E+00 |
| 20 | 0.00000E+00 | −1.25963E−05 | 2.04565E−06 | −1.06412E−07 | 2.25025E−09 |

Figure 25:
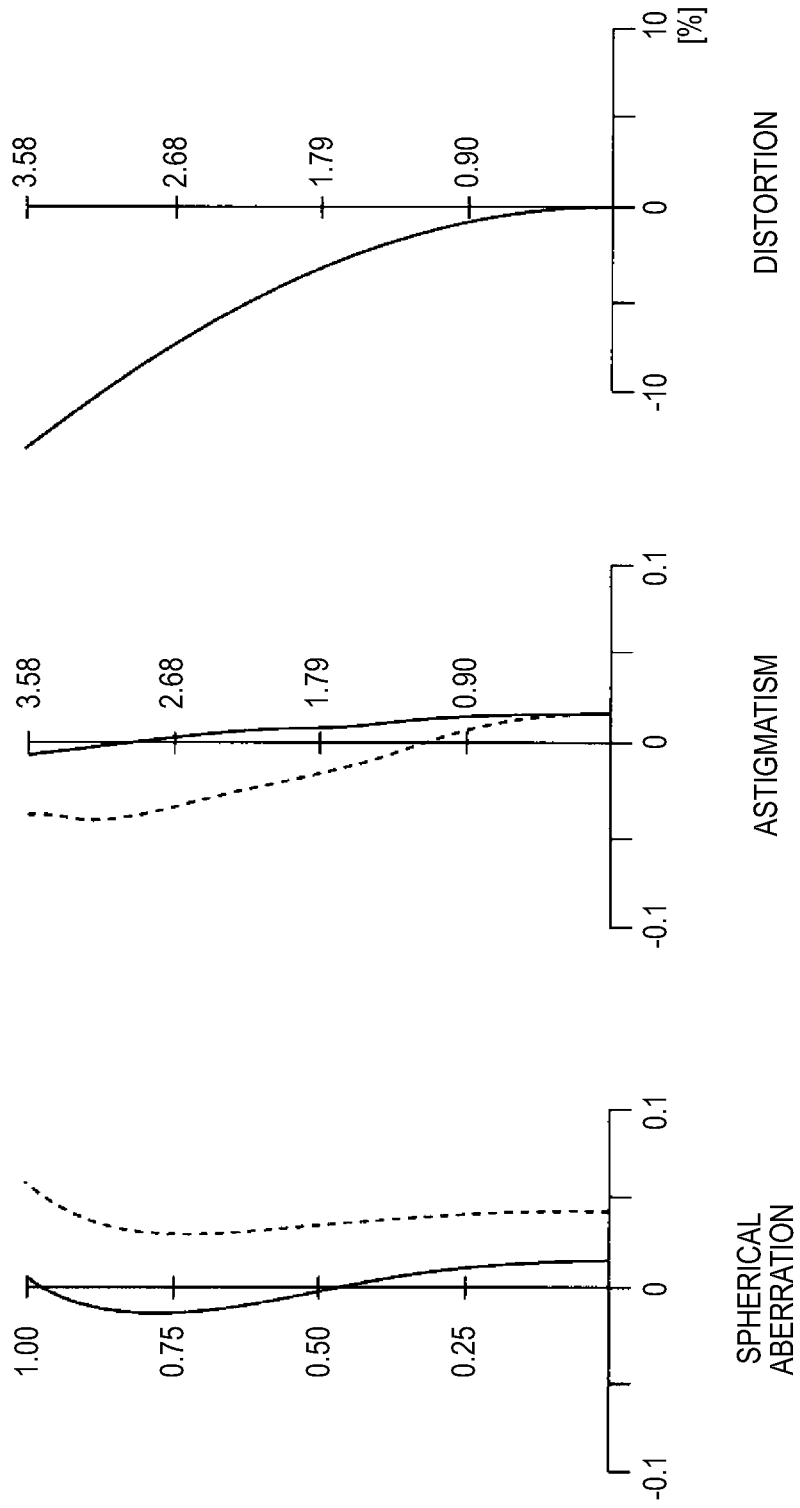
FIG. 25 shows, similarly to FIG. 26, an aberration diagram of a numerical example in which specific numerical values are applied to the eighth embodiment, and the drawing is a diagram illustrating spherical aberration, astigmatism, and distortion in the wide-angle end state.
Figure 26:
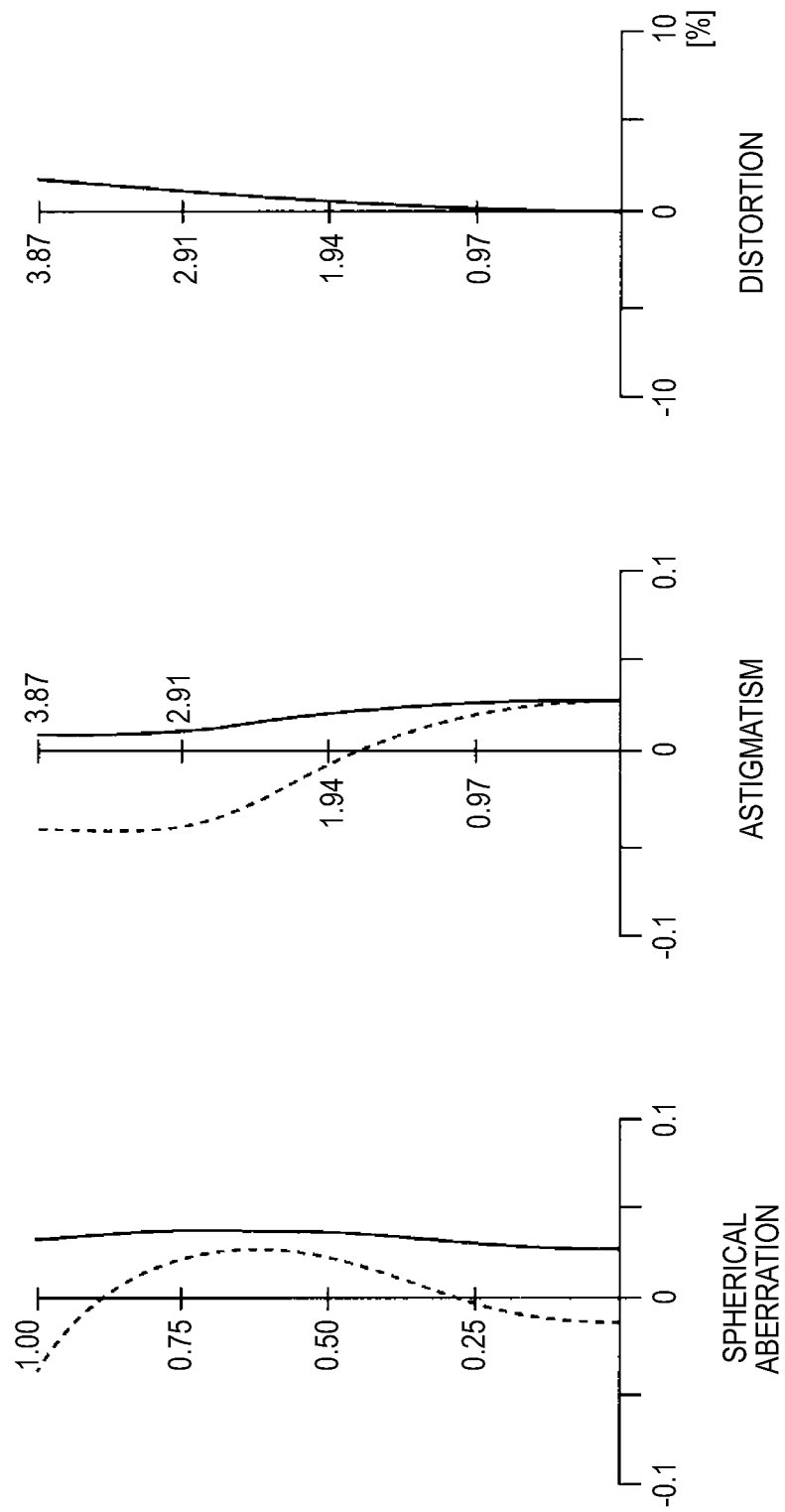
FIG. 26 is a diagram illustrating spherical aberration, astigmatism, and distortion in the telephoto end state.

FIGS. 25 and 26 show diagrams of various aberrations in a state where the focus is at infinity in Numerical Example 8, where FIG. 25 shows a diagram of various aberrations at the wide-angle end state and FIG. 26 shows a diagram of various aberrations at the telephoto end state.

In each spherical aberration diagram of FIGS. 25 and 26, the solid line represents the d-line (the wavelength of 587.6 nm), and the dashed line represents the g-line (the wavelength of 435.8 nm). In each astigmatism diagram, the solid line represents a value on the sagittal image plane, and the dotted line shows a value on the meridional image plane.

As can be clearly seen from the aberration diagrams, in Numerical Example 8, it is possible to obtain an excellent imaging performance by satisfactorily correcting various aberrations.

[Respective Value of Conditional Expressions of Zoom Lenses]

Hereinbelow, respective values of Conditional Expressions of the zoom lenses according to the embodiments of the present technology will be described.

Table 25 shows the respective values of Conditional Expressions (1) to (6) of the zoom lenses 1 to 8.

TABLE 25

| | ZOOM LENS 1 | ZOOM LENS 2 | ZOOM LENS 3 | ZOOM LENS 4 |
|---|---|---|---|---|
| R22r | 9.64 | 10.25 | 10.56 | 9.91 |
| R23f | 8.00 | 7.80 | 8.66 | 8.13 |

TABLE 25-continued

| | | | | | |
|---|---|---|---|---|---|
| CONDITIONAL EXPRESSION (1) | $0.8 < 10 \times (R22r - R23f)/(R22r + R23f) < 1.8$ | 0.928 | 1.357 | 0.991 | 0.988 |
| | D(2.23) | 0.20 | 0.20 | 0.20 | 0.20 |
| | TH2 | 4.84 | 4.76 | 4.74 | 4.81 |
| CONDITIONAL EXPRESSION (2) | $3.0 < 100 \times \{D(2.23)/TH2\} < 7.0$ | 4.131 | 4.199 | 4.220 | 4.154 |
| | f(2.3) | 11.07 | 12.04 | 12.37 | 11.24 |
| | f2 | −5.29 | −5.34 | −5.53 | −5.42 |
| CONDITIONAL EXPRESSION (3) | $1.6 < f(2.3)/|f2| < 2.5$ | 2.091 | 2.254 | 2.238 | 2.072 |
| | n23 | 2.00170 | 1.94595 | 2.00170 | 2.00170 |
| CONDITIONAL EXPRESSION (4) | $1.1 < \{R23f/(n23 - 1)\}/|f2| < 1.65$ | 1.509 | 1.544 | 1.564 | 1.497 |
| | fw | 4.80 | 4.80 | 4.81 | 4.81 |
| CONDITIONAL EXPRESSION (5) | $1.0 < |f2|/fw < 1.5$ | 1.101 | 1.112 | 1.150 | 1.128 |
| | ft | 51.78 | 51.67 | 43.19 | 58.18 |
| CONDITIONAL EXPRESSION (6) | $0.05 < |f2|/ft < 0.15$ | 0.102 | 0.103 | 0.128 | 0.093 |

| | | ZOOM LENS 5 | ZOOM LENS 6 | ZOOM LENS 7 | ZOOM LENS 8 |
|---|---|---|---|---|---|
| | R22r | 9.13 | 9.10 | 11.24 | 10.81 |
| | R23f | 7.12 | 7.00 | 8.74 | 8.16 |
| CONDITIONAL EXPRESSION (1) | $0.8 < 10 \times (R22r - R23f)/(R22r + R23f) < 1.8$ | 1.242 | 1.302 | 1.252 | 1.395 |
| | D(2.23) | 0.25 | 0.25 | 0.25 | 0.25 |
| | TH2 | 5.56 | 5.76 | 5.85 | 5.91 |
| CONDITIONAL EXPRESSION (2) | $3.0 < 100 \times \{D(2.23)/TH2\} < 7.0$ | 4.493 | 4.342 | 4.276 | 4.229 |
| | f(2.3) | 11.16 | 10.56 | 13.28 | 11.22 |
| | f2 | −6.10 | −6.04 | −6.43 | −6.27 |
| CONDITIONAL EXPRESSION (3) | $1.6 < f(2.3)/|f2| < 2.5$ | 1.832 | 1.750 | 2.065 | 1.790 |
| | n23 | 2.00170 | 1.92286 | 1.94595 | 1.92286 |
| CONDITIONAL EXPRESSION (4) | $1.1 < \{R23f/(n23 - 1)\}/|f2| < 1.65$ | 1.165 | 1.257 | 1.437 | 1.410 |
| | fw | 4.78 | 4.78 | 4.80 | 4.80 |
| CONDITIONAL EXPRESSION (5) | $1.0 < |f2|/fw < 1.5$ | 1.276 | 1.263 | 1.341 | 1.307 |
| | ft | 85.60 | 85.60 | 85.53 | 85.49 |
| CONDITIONAL EXPRESSION (6) | $0.05 < |f2|/ft < 0.15$ | 0.071 | 0.071 | 0.075 | 0.073 |

As can be seen from Table 25, the zoom lenses 1 to 8 are configured to satisfy Conditional Expressions (1) to (6).

[Surface Shape of Positive Lens of Second Lens Group]

As described above, in the zoom lens according to the embodiment of the present technology, the second lens group is constituted by three lenses of the first negative lens, the second negative lens, and the positive lens which are arranged in order from the object side to the image side, and the aspheric surface is formed on at least the object side of the positive lens in a shape of which the curvature gradually decreases as the outer periphery of the lens gets closer from the optical axis.

Accordingly, by forming the aspheric surface having such a shape on the positive lens, even when the number of lenses of the second lens group is reduced, it is possible to effectively correct coma aberration of the peripheral viewing angle in the range from wide-angle end to the telephoto end and spherical aberration of the on-axis viewing angle at the telephoto end, and thus it is possible to improve image quality.

Figure 27:
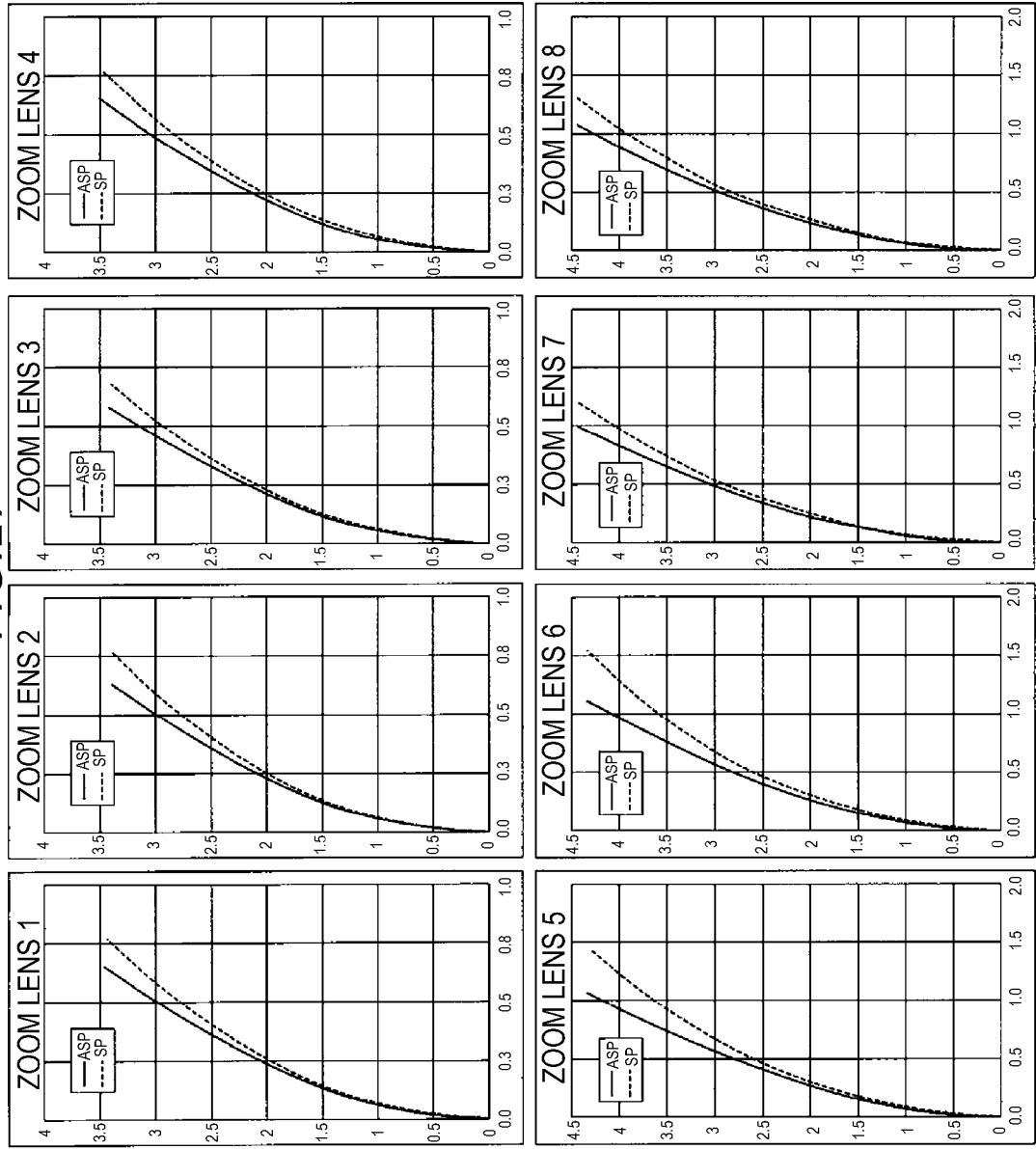
FIG. 27 is a schematic diagram illustrating comparison between a shape of the aspheric surface formed on the object side of the positive lens and the paraxial radius of curvature of the positive lens for each zoom lens.

FIG. 27 is a schematic diagram illustrating comparison between a shape of the aspheric surface r10 formed on the object side of the positive lens G6 and the paraxial radius of curvature R of the positive lens G6 for each of the zoom lenses 1 to 8. In FIG. 27, the unit of the vertical and horizontal axes is mm, ASP represents the shape of the aspheric surface r10, and SP represents the paraxial radius of curvature R.

As shown in FIG. 27, in each positive lens G6 of the zoom lenses 1 to 8, the aspheric surface is formed on at least the object side of the positive lens in a shape of which the curvature gradually decreases as the outer periphery of the lens gets closer from the optical axis.

Accordingly, in the zoom lenses 1 to 8, even when the number of lenses of the second lens group is reduced, it is possible to effectively correct coma aberration of the peripheral viewing angle in the range from wide-angle end to the telephoto end and spherical aberration of the on-axis viewing angle at the telephoto end, and thus it is possible to improve image quality.

Further, when a zoom lens which is sufficiently fast at the time of normal photography is designed such that the F number thereof at the wide-angle end is set to 3.5 or less and the F number thereof at the telephoto end is set to 6.0 or less, the above-mentioned aspheric surface shape is effective.

Furthermore, similarly to the zoom lenses 1 to 4, also when an especially fast zoom lens with a large diameter is designed such that the F number thereof at the wide-angle end is set to 2.9 or less and the F number thereof at the telephoto end is set to 5.0 or less, the above-mentioned aspheric surface shape is effective.

[Configuration of Imaging Apparatus]

An imaging apparatus according to an embodiment of the present technology includes: a zoom lens; and an imaging device converting an optical image formed by the zoom lens into an electric signal. The zoom lens includes, in order from an object side to an image side: a first lens group that has a positive refractive power; a second lens group that has a negative refractive power; and a third lens group that has a positive refractive power.

Further, in the imaging apparatus according to the embodiment of the present technology, The second lens group is constituted by three lenses of a first negative lens, a second negative lens, and a positive lens which are arranged in order from the object side to the image side. In addition, an aspheric surface is formed on at least an object side of the positive lens in a shape of which a curvature gradually decreases as an outer periphery of the lens gets closer from an optical axis.

By forming the aspheric surface with such a shape, even when the second lens group includes a small number of lenses for example three lenses, it is possible to correct coma aberration of a peripheral viewing angle in the range from the wide-angle end to the telephoto end and spherical aberration of an on-axis viewing angle at the telephoto end. Hence, it is possible to improve image quality.

Furthermore, in the imaging apparatus according to the embodiment of the present technology, the zoom lens satisfies the following Conditional Expressions (1) and (2).

$$0.8 < 10 \times (R22r - R23f)/(R22r + R23f) < 1.8 \quad (1)$$

$$3.0 < 100 \times \{D(2,23)/TH2\} < 7.0 \quad (2)$$

Here, $R22r$ is a paraxial radius of curvature of an image side surface of the second negative lens in the second lens group, $R23f$ is a paraxial radius of curvature of the object side surface of the positive lens in the second lens group, $D(2, 23)$ is an air space, which is present between the second negative lens and the positive lens of the second lens group, on the optical axis, and $TH2$ is a thickness on the optical axis from a surface closest to the object side in the second lens group to a surface closest to the image side.

Conditional Expression (1) defines a shape factor of the air lens (air gap) which is present between the first negative lens and the positive lens of the second lens group.

When the upper limit of Conditional Expression (1) is exceeded, the paraxial radius of curvature of the object side surface of the positive lens excessively decreases. Hence, it is difficult to achieve an increase in viewing angle and an increase in magnification by satisfactorily correcting aberrations in the entire zoom range, thereby causing deterioration in image quality.

In contrast, when the lower limit of Conditional Expression (1) is exceeded, the refractive power of the air lens excessively decreases. Hence, it is difficult to achieve a sufficient decrease in size of the second lens group, thereby causing an increase in size of the whole optical system.

Accordingly, by making the zoom lens satisfy Conditional Expression (1), the paraxial radius of curvature of the object side surface of the positive lens is appropriately set, and thus it is possible to achieve an increase in viewing angle and an increase in magnification by satisfactorily correcting aberrations in the entire zoom range. In addition, the refractive power of the air lens is appropriately set, and it is possible to achieve a decrease in size of the whole optical system.

Conditional Expression (2) defines the air gap of the air lens which is present between the first negative lens and the positive lens of the second lens group.

When the upper limit of Conditional Expression (2) is exceeded, the space of the air lens (the size thereof in the optical axis direction) excessively increases. Hence, the size of the second lens group increases, thereby causing an increase in size of the whole optical system.

In contrast, when the lower limit of Conditional Expression (2) is exceeded, the space of the air lens excessively decreases. Hence, during assembly of the second lens group, the first negative lens may come into contact with the positive lens. Thus, there is a concern about damage of the optical surfaces thereof. Further, there is a concern that the moisture, which is condensed in the imaging apparatus, permeates into the interspace between the lenses because of the surface tension.

Accordingly, by making the zoom lens satisfy Conditional Expression (2), the space of the air lens is appropriately set, and thus it is possible to achieve a decrease in size of the optical system, prevention against contact between lenses, and the like.

[Embodiment of Imaging Apparatus]

Figure 28:
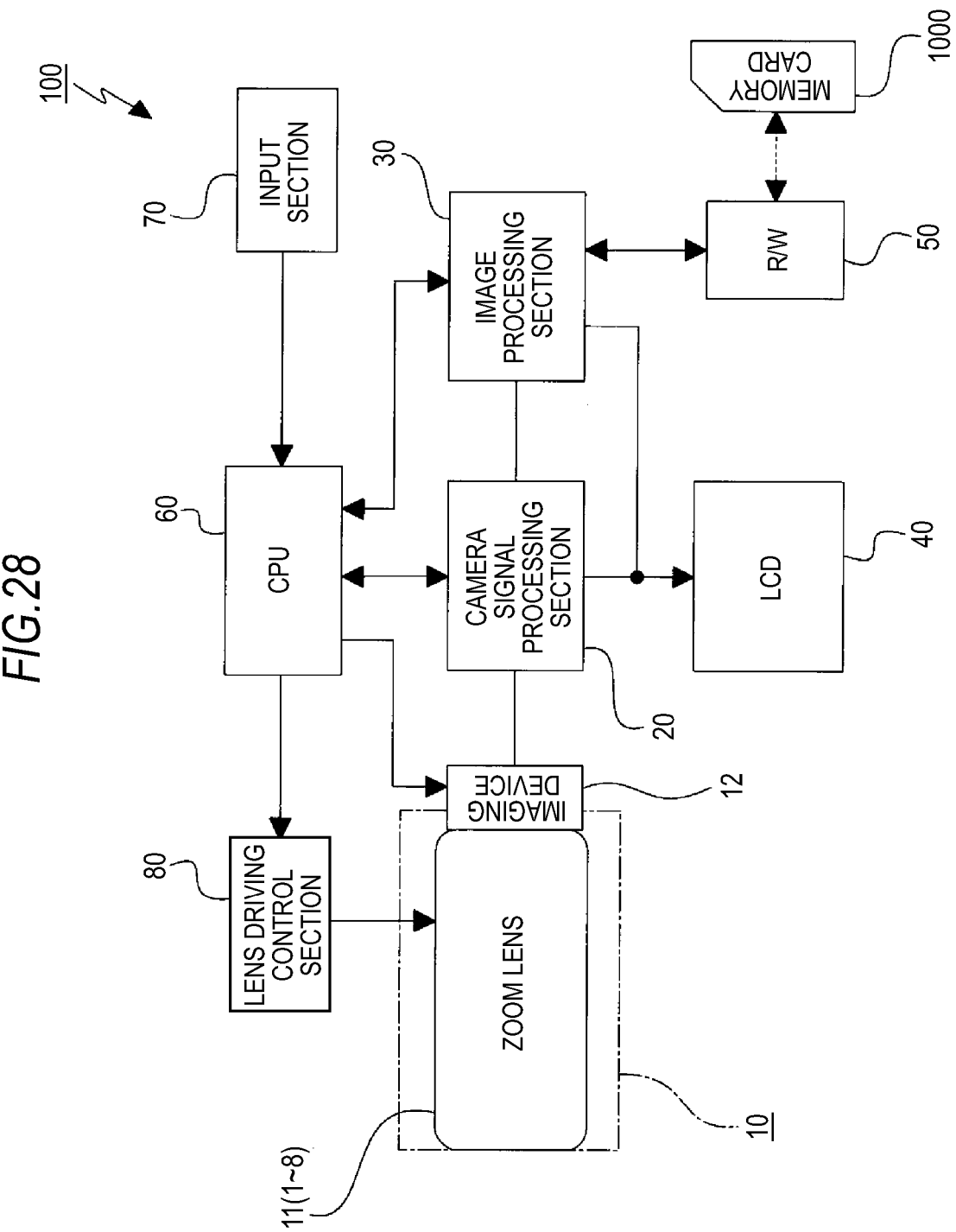
FIG. 28 is a block diagram illustrating an example of an imaging apparatus.

FIG. 28 shows a block diagram of a digital still camera as the imaging apparatus according to the embodiment of the present technology.

The imaging apparatus (the digital still camera) 100 includes: a camera block 10 that has a function of taking an image; a camera signal processing section 20 that performs a signal processing such as an analog-to-digital conversion processing on a taken image signal; an image processing section 30 that performs a process of recording and reproducing the image signal. Further, the imaging apparatus 100 includes: an LCD (Liquid Crystal Display) 40 that displays the taken image and the like; a R/W (reader/writer) 50 that writes and reads image signals in the memory card 1000; a CPU (Central Processing Unit) 60 that controls the entire imaging apparatus; an input section 70, such as various switches, that is used for a user's operation input; and a lens driving control section 80 that controls driving of the lens within the camera block 10.

The camera block 10 includes: an optical system including the zoom lens 11 (one of the zoom lenses 1 to 8 according to the embodiment of the present technology); and an imaging device 12 such as a CCD (Charge Coupled Device) sensor, a CMOS (Complementary Metal Oxide Semiconductor) sensor or the like.

The camera signal processing section 20 is configured to perform various signal processes, such as a process of conversion into a digital signal, noise removal, image quality correction, and a process of conversion into luminance and chromatic difference signals, on the output signal which is output from the imaging device 12.

The image processing section 30 is configured to perform a process of encoding for compression and decoding for decompression on an image signal based on a predetermined image data format, a process of conversion of data specification such as resolution, and the like.

The LCD 40 has a function to display various data such as a condition of the operation performed by a user with the aid of the input section 70 and a taken image.

The R/W 50 is configured to write image data, which is encoded by the image processing section 30, into the memory card 1000 and additionally read the image data which is recorded on the memory card 1000.

The CPU 60 functions as a control processing section to control all the circuit blocks within the imaging apparatus 100, and controls the circuit blocks on the basis of the instruction input signals and the like from the input section 70.

The input section 70 includes, for example, a shutter release button for performing a shutter operation, a selection switch for selecting operation modes, and the like. The input section 70 is configured to output the instruction input signal in response to the user's operation to the CPU 60.

The lens driving control section 80 is configured to control a motor, which is not shown in the drawing, for driving the lenses within the zoom lens 11 on the basis of the control signal from the CPU 60.

The memory card 1000 is, for example, a semiconductor memory which is removable from a slot connected to the R/W 50.

Next, operations of the imaging apparatus 100 will be described.

When the photographing is standby, an image signal captured by the camera block 10 under the control of the CPU 60 is output to the LCD 40 through the camera signal processing section 20 so as to be displayed as a camera-through-image. Further, when the instruction input signal for zooming is input from the input section 70, the CPU 60 outputs a control signal to the lens driving control section 80, and moves predetermined lenses within the zoom lens 11 on the basis of the control of the lens driving control section 80.

When the not-shown shutter of the camera block 10 is operated by the instruction input signal from the input section 70, the captured image signal is output from the camera signal processing section 20 to the image processing section 30, is encoded for compression, and is converted into digital data of the predetermined data format. The converted data is output to the R/W 50 and is written in the memory card 1000.

For focusing, the lens driving control section 80 moves the predetermined lenses of the zoom lens 11 on the basis of the control signal received from the CPU 60, for example, when the shutter release button of the input section 70 is pressed halfway or pressed fully for recording (photography).

For reproduction of image data recorded in the memory card 1000, the R/W 50 reads out the prescribed image data from the memory card 1000 in response to the operation performed on the input section 70. The readout image data is decoded for decompression by the image processing section 30 and the reproduced image signal is then output to the LCD 40, thereby displaying the reproduced image.

In addition, the embodiment has described the case where the imaging apparatus according to the embodiment of the present technology is applied to a digital camera. However, the application range of the imaging apparatus is not limited to the digital still camera, and it may also be widely applied to, for example, camera sections of digital input/output apparatuses such as a digital video camera, a mobile phone equipped with a camera, and a PDA (Personal Digital Assistant) equipped with a camera.

[Present Technology]

In the present technology, the following configurations can be adopted.

1. A zoom lens includes, in order from an object side to an image side: a first lens group that has a positive refractive power; a second lens group that has a negative refractive power; and a third lens group that has a positive refractive power. The second lens group is constituted by three lenses of a first negative lens, a second negative lens, and a positive lens which are arranged in order from the object side to the image side. An aspheric surface is formed on at least an object side of the positive lens in a shape of which a curvature gradually decreases as an outer periphery of the lens gets closer from an optical axis. In addition, the lens satisfies the following Conditional Expressions (1) and (2).

$$0.8 < 10 \times (R22r - R23f)/(R22r + R23f) < 1.8 \quad (1)$$

$$3.0 < 100 \times \{D(2,23)/TH2\} < 7.0 \quad (2)$$

Here, R22r is a paraxial radius of curvature of an image side surface of the second negative lens in the second lens group, R23f is a paraxial radius of curvature of the object side surface of the positive lens in the second lens group, D(2, 23) is an air space, which is present between the second negative lens and the positive lens of the second lens group, on the optical axis, and TH2 is a thickness on the optical axis from a surface closest to the object side in the second lens group to a surface closest to the image side.

2. The zoom lens of the above-mentioned configuration 1 satisfies the following Conditional Expression (3).

$$1.6 < f(2,3)/|f2| < 2.5 \quad (3)$$

Here, f(2, 3) is a focal length of the positive lens in the second lens group and f2 is a focal length of the second lens group.

3. The zoom lens of the above-mentioned configuration 1 or 2 satisfies the following Conditional Expression (4).

$$1.1 < \{R23f(n23-1)\}/|f2| < 1.65 \quad (4)$$

Here, n23 is a refractive index of the positive lens in the second lens group and f2 is the focal length of the second lens group.

4. The zoom lens of any one of the above-mentioned configurations 1 to 3 satisfies the following Conditional Expressions (5) and (6).

$$1.0 < |f2|/fW < 1.5 \quad (5)$$

$$0.05 < |f2|/fT < 0.15 \quad (6)$$

Here, f2 is the focal length of the second lens group, fW is a focal length of a whole optical system at a wide-angle end, and fT is a focal length of the whole optical system at a telephoto end.

5. In the zoom lens of any one of the above-mentioned configurations 1 to 4, an outer peripheral portion of the image side surface of the second negative lens is in contact with an outer peripheral portion of the object side surface of the positive lens.

6. In the zoom lens of the above-mentioned configuration 5, the outer peripheral portion of the object side surface of the positive lens is formed as a flat surface perpendicular to the optical axis, and the flat surface of the positive lens is in contact with the outer peripheral portion of the image side surface of the second negative lens.

7. In the zoom lens of any one of the above-mentioned configurations 1 to 6, the positive lens is formed of a glass material through molding.

8. In the zoom lens of any one of the above-mentioned configurations 1 to 7, during zooming from the wide-angle end to the telephoto end, the first lens group is shifted to the object side so as to be distanced from the second lens group, and the third lens group is shifted to the object side so as to come close to the second lens group.

9. An imaging apparatus includes: a zoom lens; and an imaging device converting an optical image formed by the zoom lens into an electric signal. The zoom lens includes, in order from an object side to an image side: a first lens group that has a positive refractive power; a second lens group that has a negative refractive power; and a third lens group that has a positive refractive power. The second lens group is constituted by three lenses of a first negative lens, a second negative lens, and a positive lens which are arranged in order from the object side to the image side. An aspheric surface is formed on at least an object side of the positive lens in a shape of which a curvature gradually decreases as an outer periphery of the lens gets closer from an optical axis. In addition, the lens satisfies the following Conditional Expressions (1) and (2).

$$0.8 < 10 \times (R22r - R23f)/(R22r + R23f) < 1.8 \quad (1)$$

$$3.0 < 100 \times \{D(2,23)/TH2\} < 7.0. \quad (2)$$

Here, R22r is a paraxial radius of curvature of an image side surface of the second negative lens in the second lens group, R23f is a paraxial radius of curvature of the object side surface of the positive lens in the second lens group, D(2, 23) is an air space, which is present between the second negative lens and the positive lens of the second lens group, on the optical axis, and TH2 is a thickness on the optical axis from a surface closest to the object side in the second lens group to a surface closest to the image side.

[Others]

In addition, the above description was given of the zoom lenses 1 to 8 as examples of the zoom lenses according to the embodiments of the present technology. However, the present technology can be applied to, other than such zoom lenses, a zoom lens having first to third lens groups of positive, negative, and positive arranged in order from the object side to the image side.

The shapes of components and the numerical values described or shown in the above-mentioned embodiments are only illustrative examples of the embodiments for carrying out the present technology, and they are not interpreted as limiting the technical scope of the present technology.

The present disclosure contains subject matter related to that disclosed in Japanese Priority Patent Application JP 2011-057060 filed in the Japan Patent Office on Mar. 15, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising, in order from an object side to an image side:
    a first lens group that has a positive refractive power;
    a second lens group that has a negative refractive power; and
    a third lens group that has a positive refractive power,
    wherein the second lens group is constituted by three lenses of a first negative lens, a second negative lens, and a positive lens which are arranged in order from the object side to the image side,
    wherein an aspheric surface is formed on at least an object side of the positive lens in a shape of which a curvature gradually decreases as an outer periphery of the lens gets closer from an optical axis, and
    wherein the following Conditional Expressions (1) and (2) are satisfied $$0.8 < 10 \times (R22r - R23f)/(R22r + R23f) < 1.8 \quad (1)$$

$$3.0 < 100 \times \{D(2,23)/TH2\} < 7.0 \quad (2)$$

where R22r is a paraxial radius of curvature of an image side surface of the second negative lens in the second lens group, R23f is a paraxial radius of curvature of the object side surface of the positive lens in the second lens group, D(2, 23) is an air space, which is present between the second negative lens and the positive lens of the second lens group, on the optical axis, and TH2 is a thickness on the optical axis from a surface closest to the object side in the second lens group to a surface closest to the image side.

2. The zoom lens according to claim 1, wherein the following Conditional Expression (3) is satisfied $$1.6 < f(2,3)/|f2| < 2.5 \quad (3)$$

where f(2, 3) is a focal length of the positive lens in the second lens group and f2 is a focal length of the second lens group.

3. The zoom lens according to claim 1, wherein the following Conditional Expression (4) is satisfied $$1.1 < \{R23f(n23-1)\}/|f2| < 1.65 \quad (4)$$

where n23 is a refractive index of the positive lens in the second lens group and f2 is the focal length of the second lens group.

4. The zoom lens according to claim 1, wherein the following Conditional Expressions (5) and (6) are satisfied $$1.0 < |f2|/fW < 1.5 \quad (5)$$

$$0.05 < |f2|/fT < 0.15 \quad (6)$$

where f2 is the focal length of the second lens group, fW is a focal length of a whole optical system at a wide-angle end, and fT is a focal length of the whole optical system at a telephoto end.

5. The zoom lens according to claim 1, wherein an outer peripheral portion of the image side surface of the second negative lens is in contact with an outer peripheral portion of the object side surface of the positive lens.

6. The zoom lens according to claim 5, wherein the outer peripheral portion of the object side surface of the positive lens is formed as a flat surface perpendicular to the optical axis, and
    wherein the flat surface of the positive lens is in contact with the outer peripheral portion of the image side surface of the second negative lens.

7. The zoom lens according to claim 1, wherein the positive lens is formed of a glass material through molding.

8. The zoom lens according to claim 1, wherein during zooming from the wide-angle end to the telephoto end, the first lens group is shifted to the object side so as to be distanced from the second lens group, and the third lens group is shifted to the object side so as to come close to the second lens group.

9. An imaging apparatus comprising:
    a zoom lens; and
    an imaging device converting an optical image formed by the zoom lens into an electric signal,
    wherein the zoom lens includes, in order from an object side to an image side, a first lens group that has a positive refractive power, a second lens group that has a negative refractive power, and a third lens group that has a positive refractive power,
    wherein the second lens group is constituted by three lenses of a first negative lens, a second negative lens, and a positive lens which are arranged in order from the object side to the image side,
    wherein an aspheric surface is formed on at least an object side of the positive lens in a shape of which a curvature gradually decreases as an outer periphery of the lens gets closer from an optical axis, and wherein the following Conditional Expressions (1) and (2) are satisfied $$0.8 < 10 \times (R22r - R23f)/(R22r + R23f) < 1.8 \quad (1)$$

$$3.0 < 100 \times \{D(2,23)/TH2\} < 7.0 \quad (2)$$

where R22r is a paraxial radius of curvature of an image side surface of the second negative lens in the second lens group, R23f is a paraxial radius of curvature of the object side surface of the positive lens in the second lens group, D(2, 23) is an air space, which is present between the second negative lens and the positive lens of the second lens group, on the optical axis, and TH2 is a thickness on the optical axis from a surface closest to the object side in the second lens group to a surface closest to the image side.

* * * * *